US008566767B1

(12) United States Patent
Kukal et al.

(10) Patent No.: US 8,566,767 B1
(45) Date of Patent: Oct. 22, 2013

(54) SYSTEM AND METHOD FOR PARAMETRIC INTERCOUPLING OF STATIC AND DYNAMIC ANALYSES FOR SYNERGISTIC INTEGRATION IN ELECTRONIC DESIGN AUTOMATION

(75) Inventors: Taranjit Kukal, Delhi (IN); Heiko Dudek, Rosenheim (DE); Jerry Alan Long, Austin, TX (US); Chris Banton, Penfield, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/304,015

(22) Filed: Nov. 23, 2011

(51) Int. Cl.
*G06F 17/50* (2006.01)
*G06F 9/455* (2006.01)
*G06F 11/22* (2006.01)
*G06G 7/62* (2006.01)

(52) U.S. Cl.
USPC ........... 716/108; 716/113; 716/132; 716/134; 716/136; 703/13; 703/14

(58) Field of Classification Search
None
See application file for complete search history.

(56) References Cited

U.S. PATENT DOCUMENTS

| | | | |
|---|---|---|---|
| 6,857,110 B1 * | 2/2005 | Rupp et al. | 716/136 |
| 7,181,384 B1 * | 2/2007 | Riggs et al. | 703/14 |
| 7,490,309 B1 * | 2/2009 | Kukal et al. | 716/132 |
| 7,543,283 B2 * | 6/2009 | Luk et al. | 717/153 |
| 7,900,165 B2 * | 3/2011 | Oh et al. | 716/136 |
| 8,244,491 B1 * | 8/2012 | Zhang | 702/69 |
| 2005/0038639 A1 * | 2/2005 | Lin | 703/14 |
| 2006/0253810 A1 * | 11/2006 | Guardiani et al. | 716/4 |
| 2008/0243414 A1 * | 10/2008 | Oh et al. | 702/85 |
| 2012/0131523 A1 * | 5/2012 | Lu et al. | 716/102 |

* cited by examiner

*Primary Examiner* — Jack Chiang
*Assistant Examiner* — Annette M. Thompson
(74) *Attorney, Agent, or Firm* — Rosenberg, Klein & Lee

(57) ABSTRACT

A system and method are provided for actuating static and dynamic analysis tools in parametrically intercoupled manner for synergistic optimization of an electronic system design. The system and method execute a timing designer process for selectively actuating the static analysis tool to conduct timing analysis based on at least one predetermined timing model and generate a plurality of estimated values for certain signal parameters to be in compliance with predetermined timing constraints. A signal exploration process is executed to receive the estimated values from the timing designer process and configure the resources of the dynamic analysis tool responsive thereto. The signal exploration process actuates the dynamic analysis tool to conduct electrical integrity analysis based on transient simulation and generate a plurality of simulated values for signal parameters. The simulated values are back annotated to the timing designer process for timing closure.

29 Claims, 27 Drawing Sheets

| | Type | | Name | Formula | Min | Nom | Max | Margin | Comment |
|---|---|---|---|---|---|---|---|---|---|
| 8 | A | | $DataRate | 1066 | | | | | For memory constraints |
| 9 | A | | $AC | 150 | | | | | Voltage Levels 175 and 150 |
| 10 | A | | $strobe | 4 | | | | | Integer Values 4, 3, 2, 18 (1.8), 16 (1.6), 14 (1.4), 12 (1.2), 1 (NOTE1) |
| 11 | A | | $data | 2.0 | | | | | Decimal Values 1.8(1.9) (NOTE2) |
| 12 | V | | ControllerParama | [..] | | | | | Set as per your project |
| 13 | V | | vtco-row | [70..100] | 70 | | 100 | | Variable for raw clock-to-output of controller switching |
| 14 | V | | vPhShift | per_clk/4 | 468.75 | 468.75 | 468.76 | | Variable for 1/4 cycle data phase shift |
| 15 | V | | intClkOfty_Cntrl | vOQSwiDty | 0 | 0 | 0 | | Delay for DQS adjustment |
| 16 | D | | Tco_dqs | [155..165]+vPhS | 600.75 | | 653.75 | | Clock to output delay |
| 17 | D | | Tco_dq | vTco_row+]-iPLL_ | 40 | | 130 | | Phase shift of per/4 from the min(Tco_dqs) |
| 18 | M | | tVA | [473.75..613.75] | 473.75 | | 613.75 | [473.75,613.75] | Signal valid time at the controller before the transition of strobe |
| 19 | M | | tVB | [298.75..488.75] | 298.75 | | 488.75 | [298.75,488.75] | Signal valid time at the controller after the transition of the strobe |
| 20 | V | | JitterSpecificatio | [..] | | | | | Pick from controller data sheet |
| 21 | V | | tPLL_PSERR | 30 | 30 | 30 | 30 | | Phase Shift Error (On 90 degree clock output for data) |
| 22 | V | | tPLL_Jitter | 0 | 0 | | 0 | | No effect on margin as the same PLL generate both write clocks (0 and 90 degree) |
| 23 | V | | tCLOCK_SKEW | 20 | 20 | 20 | 20 | | Clock skew b/w two dedicated clock networks |
| 24 | V | | Interconnect_Jitte | [..] | | | | | interconnect jitter on etch |
| 25 | V | | vClkJit | $PCBLib:vClkJit | 20 | 20 | 20 | | Variable for interconnect Clock Jitter control |
| 26 | V | | vStbJit | $PCBLib:vStbJit | 80 | 80 | 80 | | Variable for interconnect Strobe Jitter control |
| 27 | V | | vDatJit | $PCBLib:vDatJit | 100 | 100 | 100 | | Variable for interconnect Data Jitter control |
| 28 | V | | Interconnect_Jitte | vClkJit..vClkJit | -20 | 20 | 20 | | interconnect jitter on clock etch |
| 29 | V | | Interconnect_Jitte | vStbJit..vStbJit | -80 | 80 | 80 | | interconnect jitter on strobe etch |
| 30 | V | | Interconnect_Jitte | vDatJit..vDatJit | -100 | 100 | 100 | | interconnect jitter on data etch |
| 31 | V | | PropagationDelay | [..] | | | | | Estimate or take from SI |
| 32 | V | | Etch_Delay_Clk | $PCBLib:Etch_D | 545 | 545 | 545 | | Propagation delay b/w driver andd receiver (Clock-to-Controller) |
| 33 | V | | Etch_Delay_Clk | $PCBLib:Etch_D | 800 | 800 | 800 | | Propagation delay b/w driver andd receiver (Clock-to-Memory) |
| 34 | V | | Etch_Delay_DQ | $PCBLib:Etch_D | 700 | 700 | 700 | | Propagation delay b/w driver and receiver (Strobe) |
| 35 | V | | Etch_Delay_DQ | $PCBLib:Etch_D | 750 | 750 | 750 | | Propagation delay b/w driver and receiver (Data) |
| 36 | V | | Constraints | [..] | | | | | Function of above |
| 37 | C | | tDQSS | $MemLib:Bin:sul | -470 | | 470 | <728.75,-88.75> | Strobe rising time relative to rising clock edge |
| 38 | C | | tDSS | $MemLib:Bin:sul | 380 | | 545 | <816.25,> | Strobe failing edge setup time to rising clock edge |
| 39 | C | | tDSH | $MemLib:Bin:sul | 380 | | 800 | <23.75,> | Strobe failing edge hold time to rising clock edge |
| 40 | C | | tDIPW | $MemLib:Bin:sul | 490 | | 700 | <132.5,> | Pulse width of data |
| 41 | C | | tDS | $MemLib:Bin:sul | 275 | | 750 | <-31.25,><-31.25 | Data Setup Time |
| 42 | C | | tDH | $MemLib:Bin:sul | 100 | | 470 | <68.75,><68.75, | Data Hold Time |
| 43 | V | | der_su | $MemLib:Bin:sul | 75 | | | | Setup Derating Values |

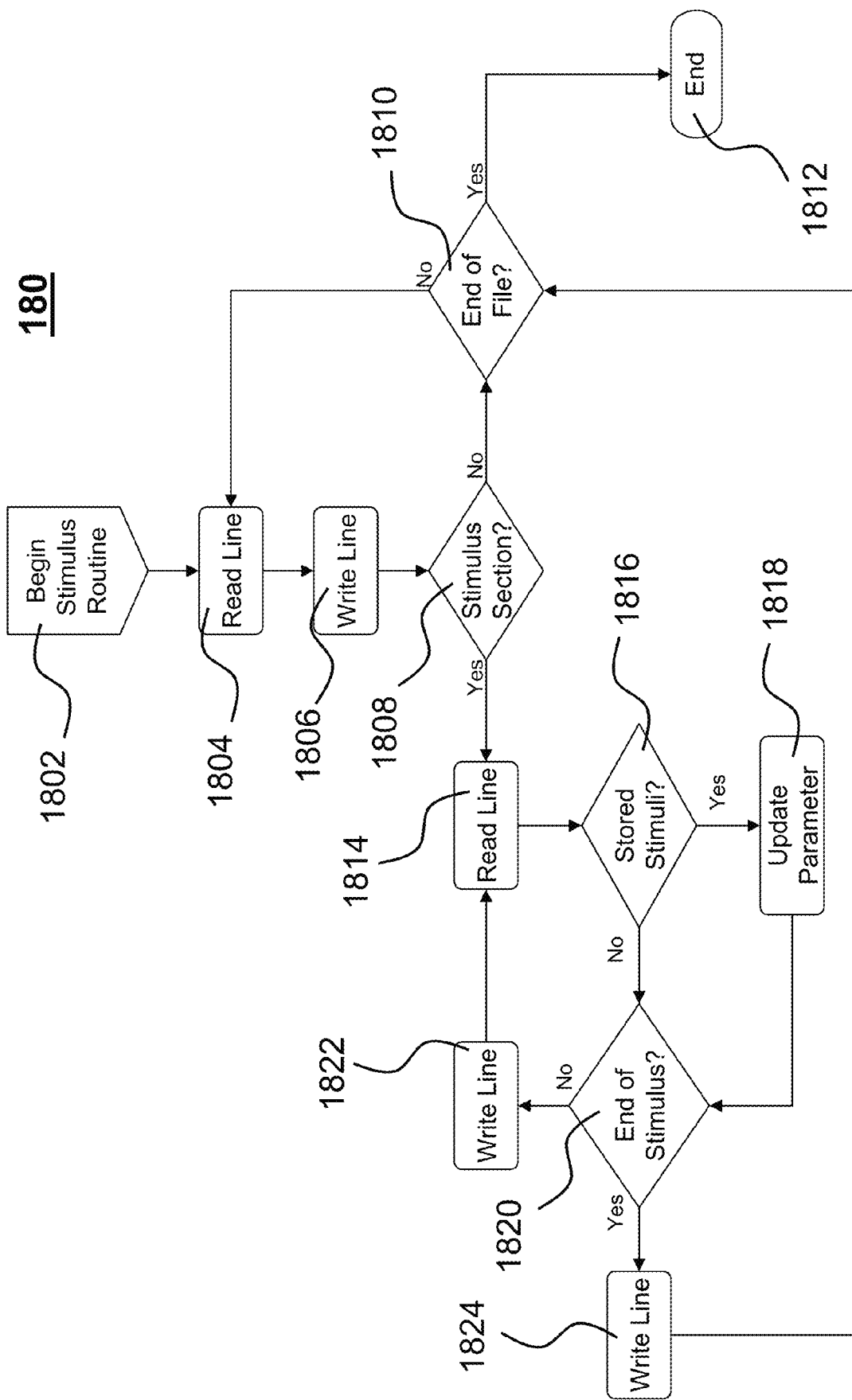

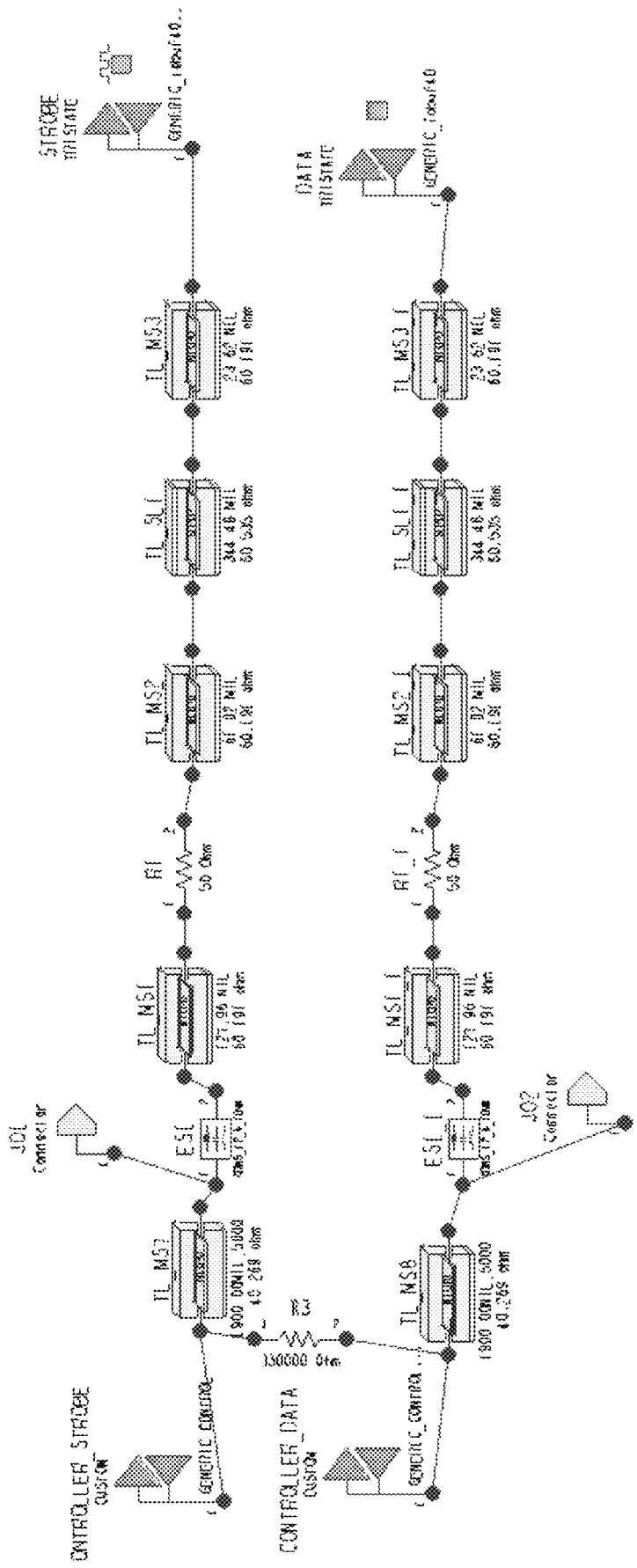
FIG. 5A1

SYSTEM AND METHOD FOR PARAMETRIC INTERCOUPLING OF STATIC AND DYNAMIC ANALYSES FOR SYNERGISTIC INTEGRATION IN ELECTRONIC DESIGN AUTOMATION

BACKGROUND OF THE INVENTION

The subject system and method are generally directed to parametrically integrating static and dynamic analyses conducted in connection with an electronic design cycle. The system and method provide automated measures for the intercoupling of static and dynamic analyses by the synergistic exchange of parametric data therebetween, whereby such static analyses as for electronic circuit timing and such dynamic analyses as for simulation-based electrical integrity are enhanced in concert. The system and method thereby enable systematic verification and optimization of an electronic system design.

With the ongoing trend of electronic system implementations growing in sophistication and complexity, it is increasingly important to quickly and accurately analyze different aspects of an electronic system's operation at various stages of its electronic design cycle. For example, a static timing analysis (STA) is normally conducted during an early stage of the design cycle without simulation, in order to obtain a fast yet reasonably accurate measure of timing in the electronic system design. Later in the design cycle, various electrical integrity analyses, such as a signal integrity (SI) analysis, are normally conducted using simulation based on behavioral modeling of the given portion(s) of the electronic system design. These static and dynamic analyses, however, are typically conducted in ad hoc manner, during their different stages of the design cycle, without any intercoupling therebetween. There is no automated coordination of the respective analysis tools to assist and enhance the operation of one in light of the other. Consequently, there is no provision for optimizing the electronic design at hand, though the use of the analysis tools may preserve compliance with the applicable constraints at different stages of design.

In the absence of sufficient integration measures in this regard, designers have tended to simply make ad hoc use of the available analysis and verification tools. This has lead to design flow inefficiencies yielding less than optimal designs. For example, designers would often carry out manual timing-checks, using hand-calculations at times to prepare for proper post-layout verification using simulation. Unfortunately, the goal in such exercises is to just ensure satisfaction of the many applicable constraints, rather than ensuring optimal design by providing sufficient margins on all constraints. Moreover, the manual calculations of timing-budget are not only time-consuming and prone to error, they fail to adequately reflect dynamic SI effects that would arise during actual operation of the electronic system under design.

Designers would also just resign themselves to following application notes of particular device manufacturers and employ pre-defined layout constraints based on layout rules they prescribe. Rigid adherence to universal specifications and recommendations such as these, however, tends to inhibit flexibility in design. Designers taking this approach may be averse to varying component selection to include those of different vendors, or to considering other variations such as in board dimensions and circuit configurations. The broad applicability inherent to manufacturers' specifications and recommendations is also likely to reflect aspects of conservative over-design, which may be good for sustained operability under wide ranges of conditions but bad for optimization of the design at hand.

EDA vendors have provided so-called design-in-kits to enable IC/package/PCB co-design, and have demonstrated the use of SI and static timing analysis tools. While such design-in-kits heretofore known in the art provide a set of models, methods, automation and reference designs (of certain IP cores) which help to make for faster design cycle, they facilitate but a piece-meal approach to the use of their resources, offering no systematic methodology by which a designer is guided to make synergistic inter-coupled use of the same. The kits' capabilities are made available for use in isolation to verify compliance with constraints at different stages of design, but not in any parametrically integrated manner sufficient to guide a methodical approach also towards optimal design.

Designers are thus left with using the design-in kit content and analysis tools in the same ad-hoc ways they are accustomed to using verification and analysis tools in a typical design cycle. While various analysis tools—such as for static timing analysis (based on transaction-based timing models) and dynamic SI analysis (based on real-time circuit simulations)—may be at their disposal, designers are not guided with any coordinated data exchange between the static and dynamic analysis tools. Hence, practicable measures for timing-closure with pre-route and post-route SI simulations are not readily available. While real-time simulation resources may be available on comprehensive design and analysis platforms for use in more exhaustive timing-verification, conducting such exhaustive timing verification at an SI or other electrical integrity analysis stage is much too time-consuming and difficult to be practicable in most applications.

There is therefore a need for a system and method which automatically coordinate parametric integration of static and dynamic analyses in an electronic design cycle for the synergistic enhancement of both. There is a need for an automated approach whereby such static analyses as static timing analysis (STA) may be intercoupled in operation with such dynamic analyses as simulation-based signal integrity analysis (SI), so that the electronic system design may be efficiently optimized while being verified in performance.

SUMMARY OF THE INVENTION

It is an object of the present invention to provide a system and method for optimizing an electronic system design by synergistically integrating static and dynamic analyses therefor through parametric data exchange across respective design flows.

It is another object of the present invention to provide a system and method for optimizing and verifying an electronic system design in a manner which saves time and promotes design flexibility.

These and other objects are attained in a system for actuating static and dynamic analysis tools in parametrically intercoupled manner for synergistic optimization of an electronic system design. The system generally comprises a timing designer unit and a signal exploration unit. The timing designer unit operates to actuate the static analysis tool to conduct timing analysis based on at least one predetermined timing model. The timing designer unit thereby generates a plurality of estimated values for a plurality of signal parameters to be in compliance with a plurality of predetermined timing constraints. The signal exploration unit is coupled to the timing designer unit. It receives the estimated values from the timing designer unit and configures resources of the dynamic analysis tool responsive thereto, thereafter actuating the dynamic analysis tool to conduct electrical integrity analysis based on transient simulation. The signal exploration unit generates a plurality of simulated values for a plurality of signal parameters, where the simulated values include refinement of at least one of the estimated values. The simulated values are back annotated to the timing designer unit for timing closure, such that further compliance with the predetermined timing constraints is re-verified upon further timing analysis according to the simulated values.

A method may be realized in accordance with the present invention for actuating static and dynamic analysis tools in parametrically intercoupled manner for synergistic optimization of an electronic system design. The method generally comprises executing in a computer processor a timing designer process for selectively actuating the static analysis tool to conduct timing analysis based on at least one predetermined timing model. The timing designer process thereby generates a plurality of estimated values for a plurality of signal parameters in compliance with a plurality of predetermined timing constraints. A signal exploration process operably coupled to the timing designer processes is executed in a computer processor to receive the estimated values from the timing designer process and configure resources of the dynamic analysis tool responsive thereto. The signal exploration process thereafter actuates the dynamic analysis tool to conduct electrical integrity analysis based on transient simulation. The signal exploration process generates a plurality of simulated values for a plurality of signal parameters, and the simulated values include refinement of at least one of the estimated values. The simulated values are back annotated to the timing designer process for timing closure, whereby compliance with the predetermined timing constraints is re-verified by further timing analysis according to the simulated values.

In certain embodiments, the system and method are implemented in a design-in kit for an IP core stored on a computer readable medium. The design-in kit comprises program instructions executable in a computer processor. In operation, the design-in kit provides for executing a design capture process which captures predetermined parametric information for the electronic system design and configures resources of the static and dynamic analysis tools responsive thereto. A timing designer process is executed for selectively actuating the static analysis tool to conduct timing analysis based on at least one predetermined timing model. The timing designer process thereby generates a plurality of estimated values for a plurality of signal parameters in compliance with a plurality of predetermined timing constraints. A signal exploration process is executed to receive the estimated values from the timing designer process and configure the resources of the dynamic analysis tool responsive thereto. The signal exploration process thereafter actuates the dynamic analysis tool to conduct signal integrity (SI) analysis based on transient simulation on at least one SI topology behaviorally modeling a conductive interconnect portion of the electrical system design. The signal exploration process generates a plurality of simulated values for a plurality of signal parameters, with the simulated values including refinement of at least one of the estimated values. The simulated values are back annotated to the timing designer process for timing closure, whereby compliance with the predetermined timing constraints is re-verified by further timing analysis according to the simulated values. A post-route signal exploration process is executed to actuate the dynamic analysis tool to conduct with respect to a plurality of predetermined layout constraints post-route SI analysis based on transient simulation on at least one SI topology behaviorally modeling a conductive interconnect portion routed for the electrical system design. The post-route signal exploration process generates a plurality of post-route simulated values for a plurality of signal parameters. The post-route simulated values are also back annotated to the timing designer process for post-route timing closure.

In certain other embodiments, the signal exploration process of the design-in kit is executed to automatically configure the SI topology and the transient simulation therefor responsive to the estimated values received from the timing designer process.

BRIEF DESCRIPTION OF THE DRAWINGS

FIG. 3A is an illustrative representation of a graphic user interface generated during system operation in an exemplary embodiment of the present invention, showing the display of a timing parameter window example;

FIG. 3B is an illustrative representation of a graphic user interface generated during system operation in an exemplary embodiment of the present invention, showing the display of a signal timing diagram window example;

FIG. 4A is an illustrative representation of a graphic user interface generated during system operation in an exemplary embodiment of the present invention, showing the concurrent display of certain dialog windows during the exchange of parametric values between static and dynamic analyses;

FIG. 4F is a flow diagram illustrating a flow of processes for a stimuli processing routine carried out during the SI topology generation in accordance with an exemplary embodiment of the present invention;

FIG. 5A1 is an illustrative representation of a graphic user interface generated during system operation in an exemplary embodiment of the present invention, showing an example of a combined SI topology configured for SI simulation, as represented in a certain dialog window;

FIG. 5A is an illustrative representation of a graphic user interface generated during system operation in an exemplary embodiment of the present invention, showing the concurrent display of certain dialog windows for analyzing eye diagram waveforms generated by SI simulation;

DETAILED DESCRIPTION OF THE PREFERRED EMBODIMENTS

Figure 1A:
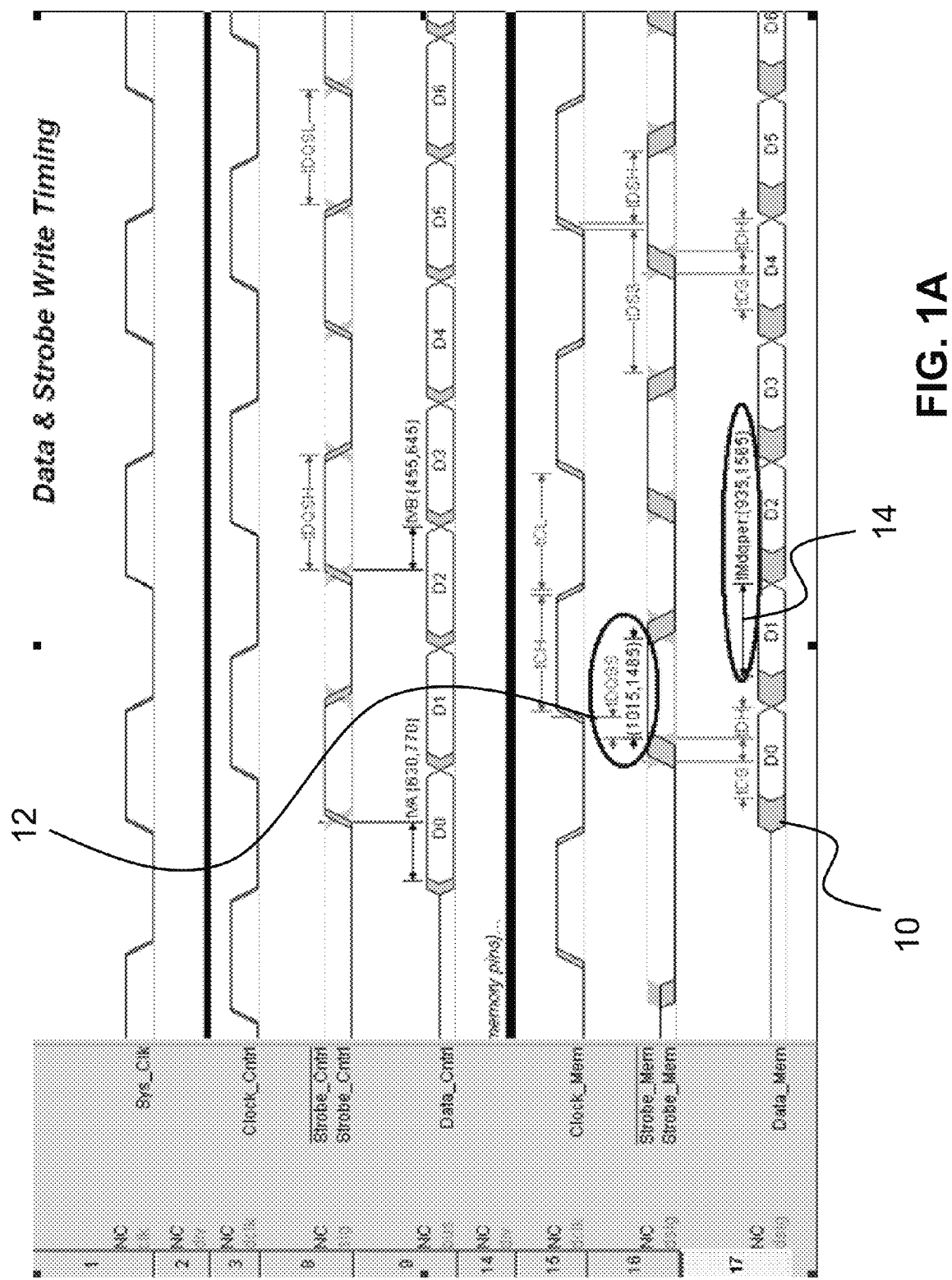
FIG. 1A is a schematic diagram illustrating timing diagrams of certain signals during a memory write cycle in accordance with an exemplary embodiment of the present invention.

Signals within a system may generally be modeled as a voltage waveform transmitted from some driver portion of an electronic system to some receiver portion. In a digital application, the signal is normally defined by a stream of binary voltage values passed between the driver and receiver portions, which may be represented in simulated environments by corresponding behavioral models (such as IO buffer models). Signal integrity (SI) analysis is conducted using transient simulation on a corresponding SI topology (an effective circuit based on such behavioral models) between the driver and receiver portions, with suitable stimulus signals.

Simulation-based analyses, such as Signal Integrity (SI) analyses, are ways to establish the baseline performance of electronic system designs before expending valuable resources in prototyping the same. These analyses are carried out using suitable simulation and analysis tools. In the case of SI analysis, the analysis is carried out using simplified simulation runs based on behavioral models, rather than on actual transistor or other such hardware models. The benefits of this—in terms of streamlined simulation runs, and the faster analyses and the reduced design cycles they permit—are considerable given that a typical electronic circuit board design may contain thousands of nets or more. While simulation runs based on actual transistor models would provide more extensive information about all that is occurring in the modeled hardware, the processing loads and execution times required for the runs would be prohibitive for many applications. Moreover, since SI analysis focuses primarily on signal quality (strengths, speeds, fidelity, and the like), the added information would hardly enhance SI analysis enough to justify the additional processing and time costs.

SI analysis evaluates signals passing from a driver IO buffer to a receiver IO buffer through one or more physical interconnects like traces, connectors, vias, etc.—collectively referred to herein as 'nets.' SI analysis thereby characterizes the quality of transmitted signals through the given nets.

Various forms of source synchronous systems are known in the art. By way of example, one widely used source synchronous interface is the so-called dual (or double) data rate (DDR) memory interface governing communications between a system controller and a memory module. An address or other control signal (collectively referred to herein as 'address' signal) is transmitted along with its corresponding clock signal, while each data signal relating to the address signal is transmitted along with its corresponding strobe signal in order to meet timing requirements with minimal skew.

The address signal is normally latched on a transitional edge of a single ended clock signal (typically carried over a unidirectional bus), while a data signal is normally latched on both transitional edges of the strobe signal (typically carried over a bidirectional bus), such that two data bits are written/read per strobe cycle, making the data rate double the strobe rate. The strobe signal is actually illustrated in the embodiments disclosed herein to be a differential signal, with the data signal being latched at each crossing of the strobe's complementary signal components.

Different versions of DDR architecture have been implemented in the memory art. In each different version of this architecture, a system controller is suitably interconnected by buses and nets to a memory module implemented in the form of a dual inline memory module (DIMM) having a plurality of dynamic random access memory (DRAM) devices.

As in other synchronous digital applications, source synchronous signals are ideally transmitted in digitally synchronized manner. Still, timing errors are possible in the form of set up time or hold time violations due to time-misalignment of corresponding signals.

There are several sources for such timing errors, and examples are noted in FIG. 1A, which illustrate timing diagrams of certain data, strobe, clock, and other signals during a memory write cycle. Referring to FIG. 1A, signals are transmitted on a chip or printed circuit board (PCB) through conductive traces routed to interconnect different portions of a circuit. In actual operation, these signals are subjected to jitter 10 which causes uncertainty as to a signal's transition edge. This may be due to various sources, such as clock jitter, IO buffer transmission jitter, or interconnect cross-talk jitter. Electrical constraints are provided to account for this jitter uncertainty.

Another source of timing error is the skew 12 resulting from relative etch delays, as between strobe and clock signals. Conductive traces and interconnections which define a signal path between particular driver and receiver portions of a circuit make for a certain physical etch length that requires some finite time, or etch delay, for a signal to propagate through. Corresponding signals, such as data and strobe or address and clock in source synchronous design, may therefore arrive at the same physical destination at different times. That is, the strobe and clock signal 'flight times' may be skewed. This may disrupt the reading and writing of data if not otherwise compensated for.

Accordingly, proper relative alignment, or leveling, of associated strobe and clock signals is required for accurate reading and writing. In the case of a write operation, the arrival of related clock and strobe signals (launched by a system controller) at a particular memory device must substantially coincide. In the case of a read operation, the arrival of all strobe signals sent from different memory devices must substantially coincide at the system controller. This means that suitable synchronization measures must be carried out (in the system controller, for example) to effect the required write leveling and/or read leveling.

For write leveling, the launch of different strobe signals is delayed by the system controller to coincide with the clock signal's arrival at each of the given memory devices. Conversely, for read leveling, the responsive transmissions of earlier addressed memory devices (via the clock signal) are delayed by appropriate intervals such that the different memory devices' strobe signals arrive substantially at the same time at the system controller. Proper timing for both write and read leveling requires the write and read leveling constraints to reflect the proper skew. In the example shown, related strobe and clock signals must be within the write leveling constraint 12, or within time tDQSS of one another.

In the source synchronous memory write application illustrated in FIG. 1A, the data signal Data_Mem is latched at the differential strobe signal's center, or where the differential components $\overline{\text{Strobe\_Mem}}$ and Strobe_Mem cross. The strobe and data signals are ideally 90° out of phase, so that strobe center occurs midway through a corresponding data pulse, and setup/hold margins are balanced on either side as described in following paragraphs. Since each pulse of the data signal Data_Mem includes jitter, that portion of the pulse excluding the uncertain jitter portion represents the data valid window 14; and, strobe center is optimally situated at the mid-point of this data valid window 14.

Figure 1B:
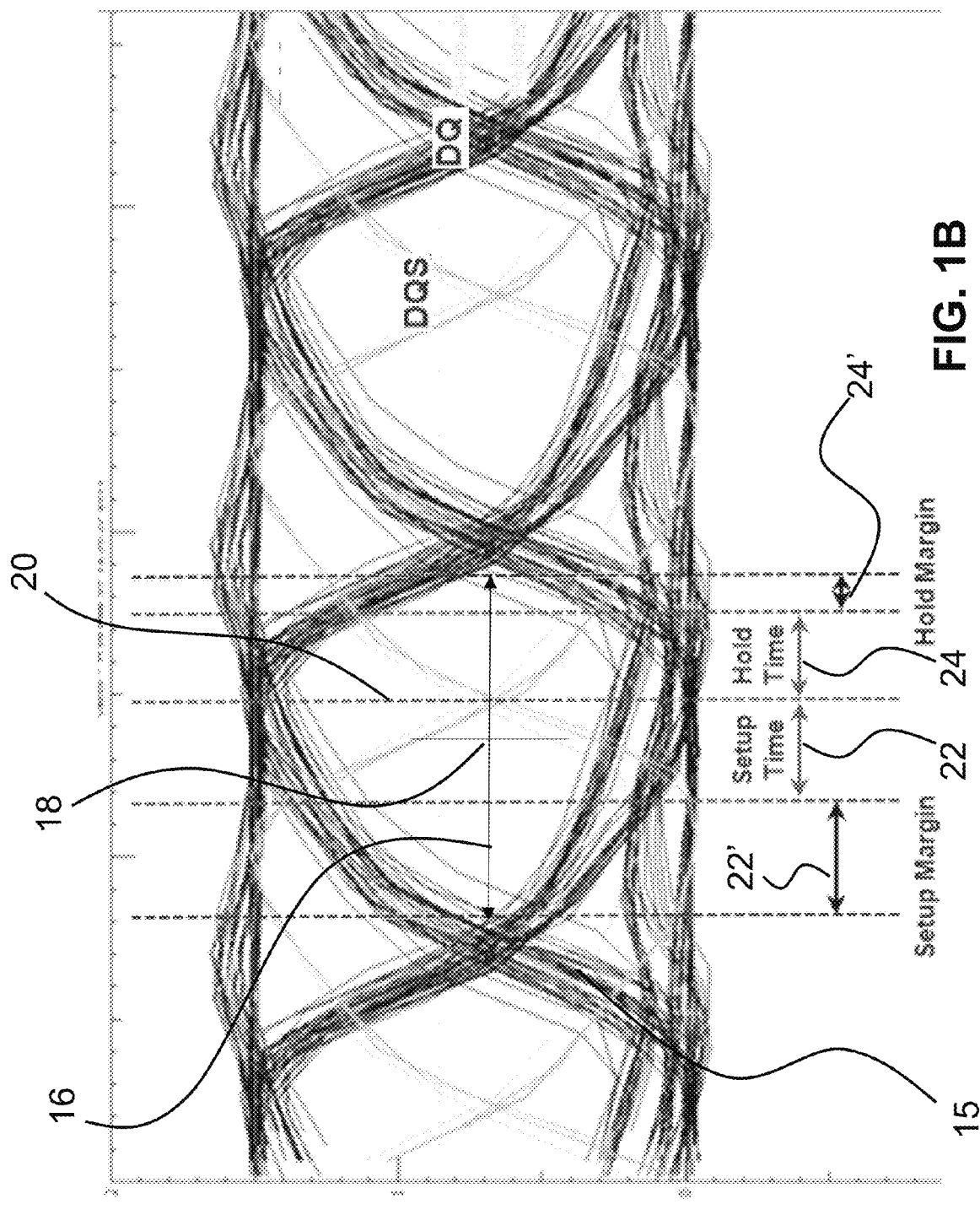
FIG. 1B is a graphic representation of an eye diagram formed by waveforms for corresponding data and strobe signals in accordance with an exemplary embodiment of the present invention.

Referring now to FIG. 1B, a so-called eye diagram is illustrated, showing in greater detail the voltage waveforms of a data signal DQ and its associated strobe signal DQS resulting from SI simulation. Jitter 15 is evident in each of the signals, in particular the data signal DQ. Referenced in the diagram are the data valid window 16 and its center point 18, as estimated by static timing analysis of the given circuit portion. The waveforms show that while the simulated strobe center 20 occurs within the data valid window 16, it actually occurs a bit later than estimated (actual strobe center 20 offset from estimated strobe center 18). Nonetheless, the required setup time 22 (the minimum time that the data signal must remain valid prior to the occurrence of strobe center) and hold time 24 (the minimum time that the data signal must continue to remain valid after the occurrence of strobe center) are still disposed within the estimated data valid window 16, leaving setup and hold margins 22', 24' with respect to the window limits on either side.

The increasing density and higher operating frequencies of electronic system designs impose great numbers of various timing and Signal Integrity constraints like those noted above, making it increasingly difficult to explore signal topologies and meet all constraints at the same time. Designers may take steps to fix a few constraint violations, only to put others out of compliance in the process. Source synchronous protocols like dual data rate versions DDR2, DDR3, and DDR4 present numerous SI and Timing constraints, and satisfying all of them presents an unwieldy solution-space to explore. Signals and their harmonic content in these applications typically operate at GHz frequency ranges and at very low voltages, requiring designers to continually verify SI and timing measurements against specified limits. Unless they resort to a very tedious step by step approach to meet constraints, they are not able to even approach optimal design.

Suitable timing closure must occur from the results of SI simulations. Referring back to FIGS. 1A-1B, examining the eye diagram resulting from SI simulation with certain etch delays, it is not enough to obtain just positive setup/hold margins. Optimal design requires setup and hold margins having substantially even distribution. That is, ample margins should be available before and after the strobe center within a data window to afford enough play for robust design. For example, it is better that the designer keeps the etch delays so as to realize a 100 ps setup margin and a 100 ps hold margin—as opposed to, say, a 199 ps setup margin and a 1 ps hold margin. The designer's goal at this point is not merely to meet the applicable constraints (as in the latter case), but to also preserve sufficient buffer on important constraints to afford the best trade-offs (should they become necessary) for optimal design.

Yet, the required timing closure proves to be excessively time-consuming in many applications given the great number of constraints typically having to be met. For example, the requirement to maintain relative delays between data (strobe) and address (clock) adds to the challenge. The etch delays needed for timing closure with respect to a read cycle may not be suitable for timing closure with respect to a write cycle.

It is also important yet difficult to keep track of a budget for signal and interconnect jitter on various signals. A signal that appears to meet a constraint may very well fail due to jitter uncertainty in the signal. Failure to accurately track this budget through different stages of analysis would invariably compromise the design.

General Approach: Design Optimization

In broad concept, the subject system and method provide for automatically guiding the parametric intercoupling of static timing and dynamic integrity analyses for their synergistic integration. They provide automated measures which may be implemented in connection with comprehensive design and analysis systems that are employed to guide users through different stages of electronic design automation (EDA).

In accordance with a preferred embodiment of the present invention, the subject system and method automate the inter-coupling of timing and SI analysis using models for an IP core preferably provided by a design-in-kit (such as described in following paragraphs). The system and method generally employ transaction-based timing-models to estimate parametric values by which to configure corresponding SI topologies. Upon simulation on the SI topologies, some estimated values are refined and other parametric values are generated. These parametric values are annotated back to the timing models for timing closure. The process is preferably carried out in the context of pre-route SI simulation, then in the context of post-route SI simulation.

In an exemplary embodiment of the present invention, the system and method provide for quick automatic estimation of such parametric values as etch delays for various signals needed to meet timing constraints, based on static timing analysis. They automatically generate recommendations on an interconnect jitter budget and relative delays needed for best setup/hold-times. The estimated parameter values in question are then passed as inputs for automated generation of corresponding SI topologies, or alternatively, the adaption of predefined SI topologies. SI topology exploration is thereby carried out based on the estimated parameter values. During the process, designers are preferably permitted the opportunity (through a suitable user interface(s)) to design for termination values, IO-buffer strengths, equalization taps of IO-buffers, and the like in the SI topologies.

Subsequent SI simulation on the resulting topologies preferably takes into account relational topologies (such as between data-strobe, address-clock), whereby various interconnects get analyzed in relation to each other, to refine the relative-etch-delays preferably against timing checks for different read/write combinations, and to generate other parametric values. The resulting parametric values are then annotated back to the timing models for timing closure (by which timing checks are done to verify all timing constraints). Once timing closure is completed for pre-route SI results, layout constraints are suitably generated in terms of parameters like net schedules, etch-delays, and maximum un-parallel length in differential pairs. Following a further round of SI simulation with post-route parameter values, post-route SI-timing closure is completed.

So-called design-in kits are known in the art to facilitate the incorporation of certain IP (intellectual property) cores into a particular electronic system design. An IP core typically represents a modular block of software (logic or data) that may be configured for ready insert into the electronic system designs of various users. Although IP cores may include hardware elements, they are often provided for greatest flexibility in software form—using netlists defining and integrated circuit of logic gates and their interconnection, hardware description language (HDL) code, or the like.

A design-in kit for a particular IP core offers a full suite of software (and hardware in certain cases) resources to help designers incorporate the IP core into their electronic system designs. These design-in kits typically come with various predefined behavioral models, ready-to-run topology files, PCB reference files, documentation, application notes, and other utilities for aiding insertion of the IP core into a particular design.

A system and method formed in accordance with an exemplary embodiment of the present invention include automated measures which are preferably incorporated with the resources provided by a design-in kit for a particular IP core. Such a design-in kit implemented with the automated measures in the manner disclosed herein is preferably equipped with:

Pre-created SI topologies for various predefined layout combinations for early analysis;

Built-in layout constraint templates whose constraint values are filled based on SI simulations and timing closure, and used to drive PCB layout;

Models of IO-buffers;

Transaction-based timing models aligned with SI topologies, to facilitate the exchange of data across timing and SI analysis tools;

Pre-created measurements (both for timing and SI) for verification of solution-space when parameters of interest are swept in simulations.

Figure 1C:
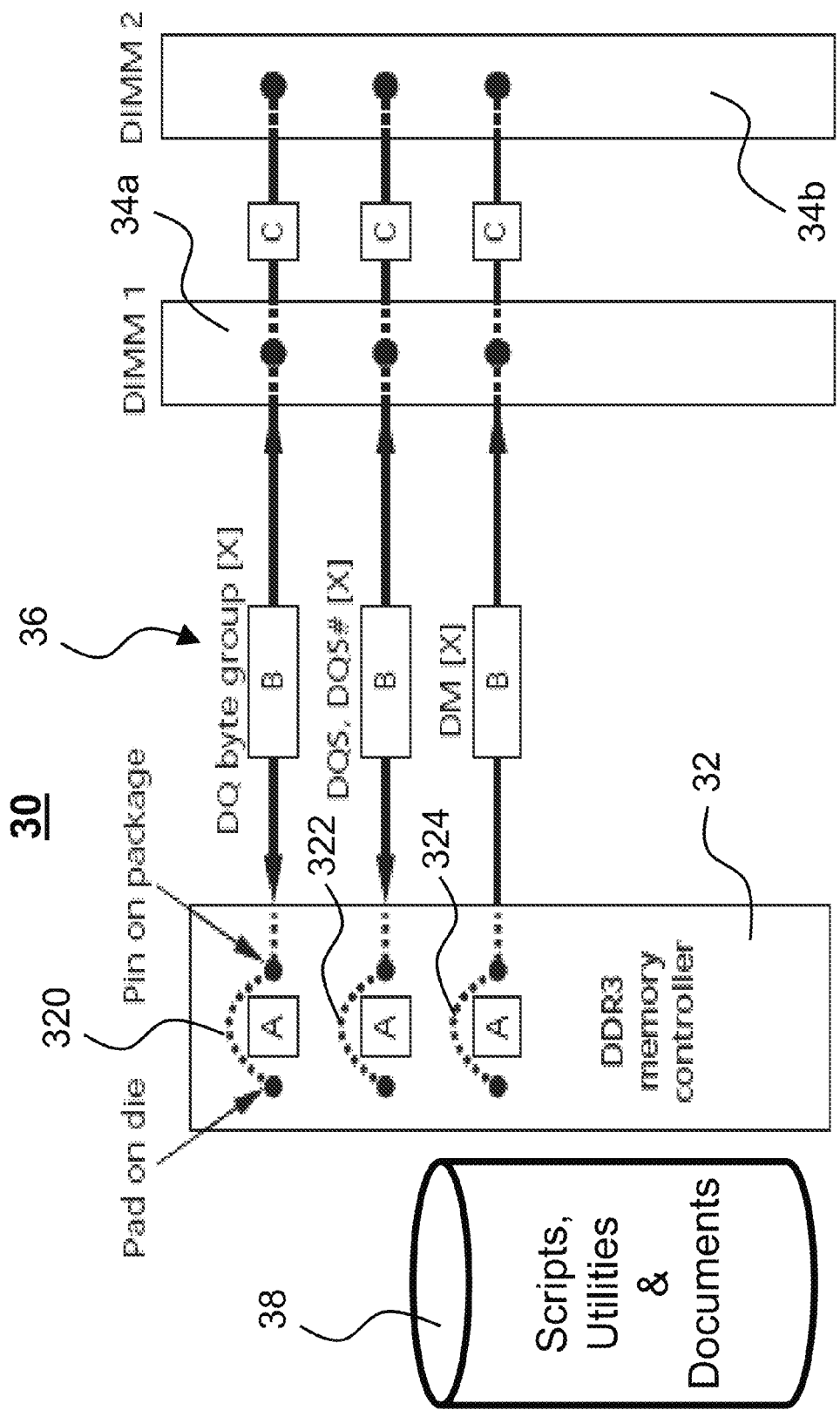
FIG. 1C is a schematic diagram illustrating an example of a design-in kit employed in certain embodiments of the present invention, containing illustrative IP resources.

One example of a design-in kit 30 containing IP resources for DDR3 memory is illustrated in FIG. 1C. The illustrative kit 30 includes amongst its IP contents models for a DDR3 memory controller 32, DIMM modules 34a, 34b, timing/deration elements 36, and assorted utilities 38. Models for the DDR3 memory controller preferably include controller 10 and IC package models 320, 322, 324, while the models for the modules 34a, 34b preferably include base SI topologies for the DIMM's, along with the memory and connector models pertaining thereto. The store of utilities 38 provide such things as scripts for use in creating/accessing various files, as well as predefined parameter values, supporting documents, application notes, and other references. Various predefined electrical constraints are associated with the memory controller 32 and DIMM modules 34a, 34b.

In alternate embodiments, the automated measures may be otherwise incorporated with the resources available in a more comprehensive design and analysis platform of any suitable type known in the art. As alluded to above and further detailed in following paragraphs, the automated measures execute to guide a user through systematic exploration from transaction-based timing to signal integrity, with synergistic inter-coupling of the respective analyses.

Figure 2A:
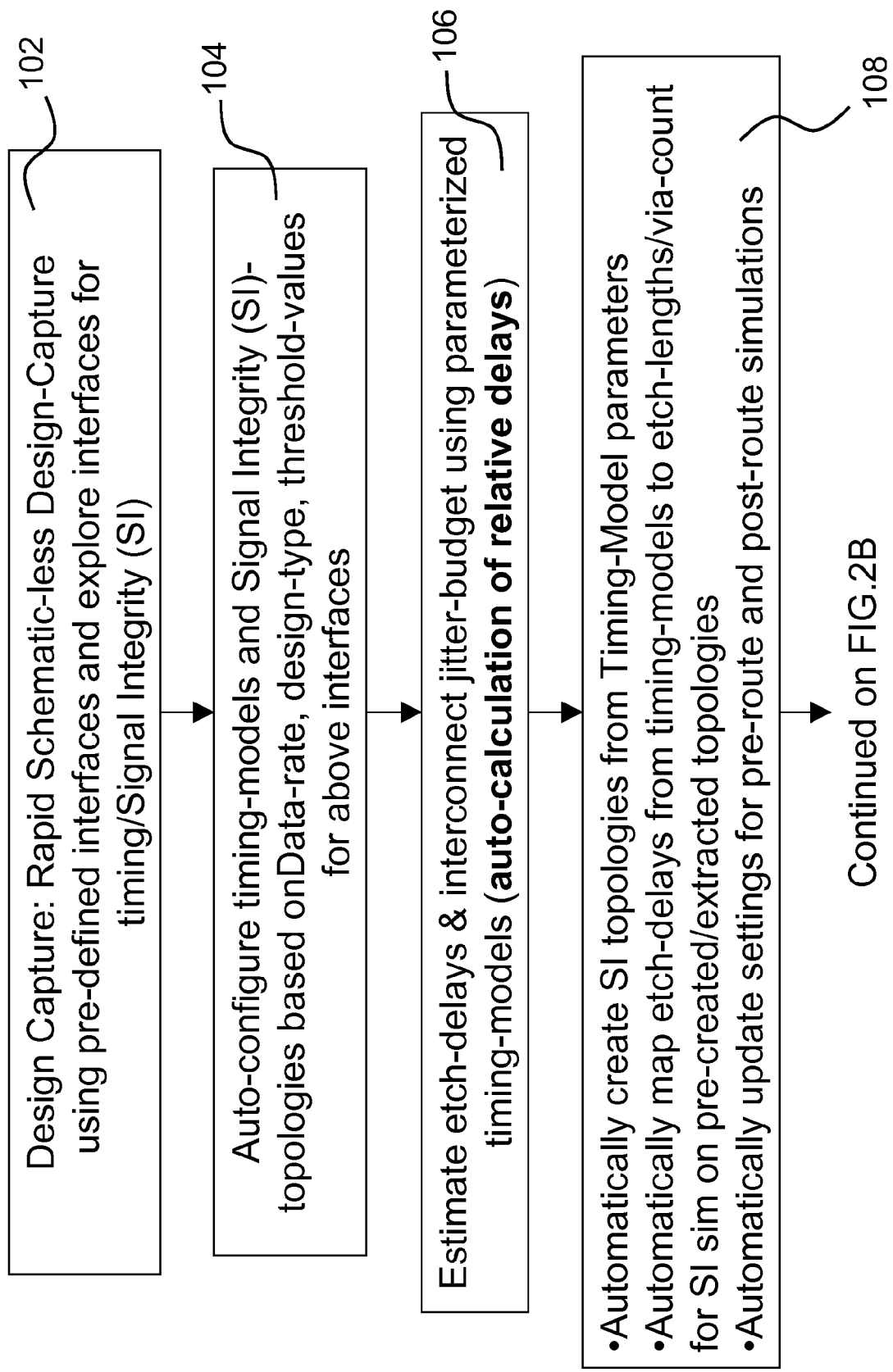
FIG. 2A is a first portion of flow diagram illustrating an overall flow of processes generally carried out by an exemplary embodiment of the present invention.
Figure 2B:
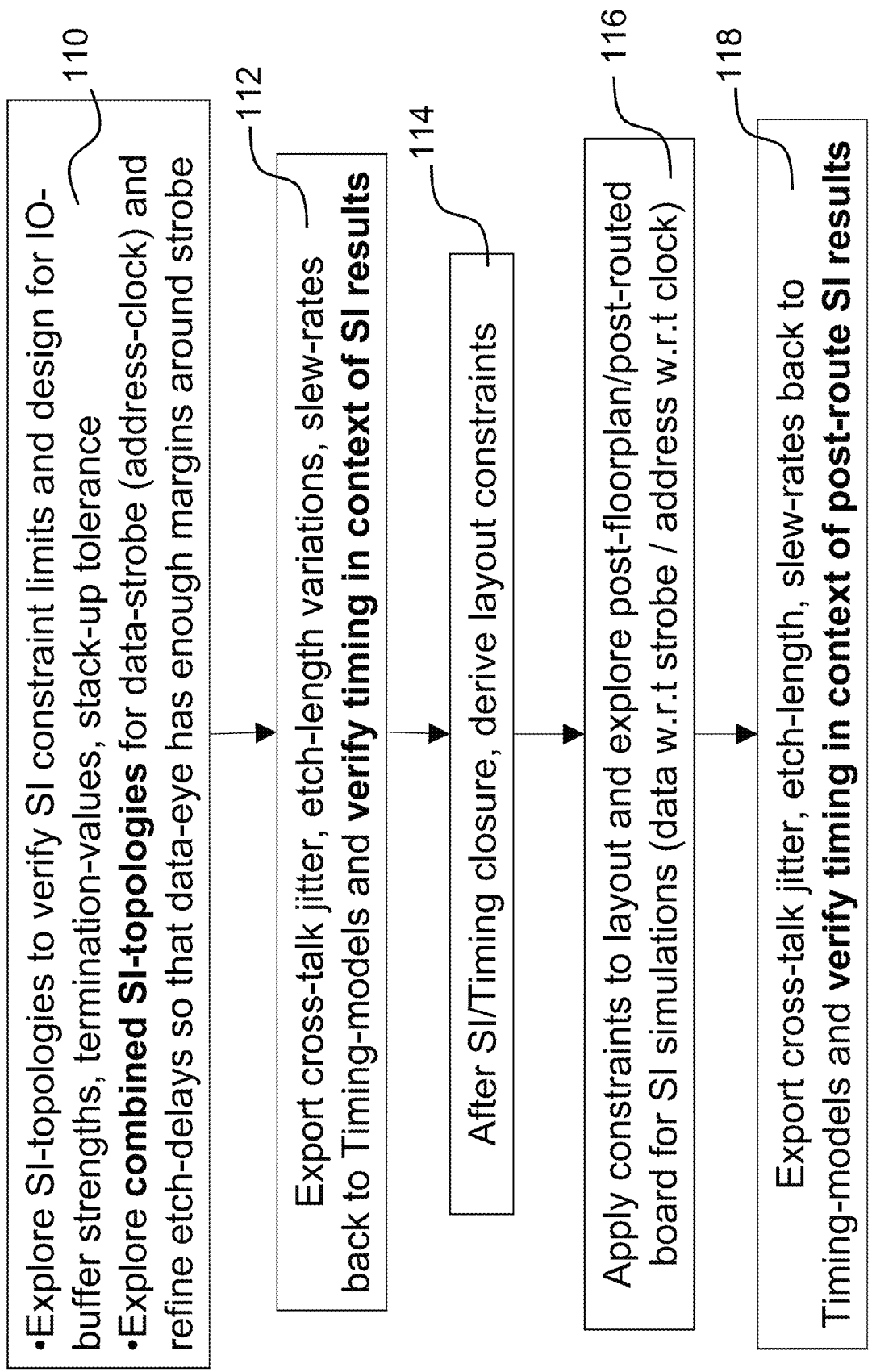
FIG. 2B is the second portion of the flow diagram partially shown in FIG. 2A.

Turning now to FIGS. 2A-2B, there is illustrated an exemplary flow of processes generally carried out by the automated measures in an exemplary embodiment of the present invention. At block 102, the relevant portions of the electronic system design at hand are quickly captured from the supporting database or other memory. Among other things, predefined interfaces for the IP core to be designed-in (to the electronic system under design) are captured in preparation for synergistically coordinated timing/SI exploration.

Timing models and SI-topologies of the given design-in kit are automatically configured at block 104, consistent with the prevailing requirements of the electronic system design. The applicable set of timing models and SI topologies from the design-in kit are configured, for example, according to parametric settings for certain data-rates, design-types, switching/state thresholds, and the like.

At block 106, static timing analysis is carried out on timing models which have been parametrically updated at block 104. Timing exploration of the interfaces captured at block 102 is made in this manner to automatically calculate initial estimates for the etch-delays required to meet various timing protocols. Instead of guessing at the etch delays trial and error, the parameterized timing models are analyzed to automatically calculate the required etch-delays for each of the signals in question, namely data, strobe, address, clock in a source synchronous design. Analysis of the timing models preferably also provides estimates for the required timing trade-offs in these signals between read and write cycle operations, as well as a tolerance margin, or budget, for interconnect jitter which tends to plague signals during actual operation.

Such timing exploration is carried out using static transaction-based timing models. While not as accurate as dynamic, stimulus-responsive behavioral models, these timing models enable quick and effective auto-calculation of initial etch-delay estimates by which to adaptively configure the corresponding behavioral models for more reliable SI analysis. The relative etch-delay calculations are automated with the goal of a balanced allocation of setup/hold times about strobe center within a data window.

The flow of processes then proceeds to block 108, at which SI topology exploration is carried out based on the results of the preceding timing exploration. The etch-delays and interconnect jitter estimated at block 106 are exported to this SI topology exploration process. The SI topologies associated with the IP core (or portions thereof), as incorporated in the electronic system design, are automatically generated based in part on this estimated timing information. Each SI topology defines an interconnection of behavioral models representing the circuit elements (components, interconnections, conductive trances, and the like) through which a particular signal is transmitted in passing between certain driver and receiver portions of the given circuit.

If certain pre-defined SI topologies are to be used, they are automatically updated or auto-created to suitably reflect the estimated timing information. It is to be understood that references generally made herein to an SI topology being 'updated' in this regard are not necessarily limited to just modification of a pre-existing SI topology, but contemplates the automatic creation of a new SI topology, where appropriate for the intended application. The SI topologies are thus adaptively configured for SI simulation in light of estimates obtained by timing exploration for the etch-delay and signal jitter-budget required for various signals to meet timing constraints.

Also at block 108, settings for pre-route or post-route simulations are automatically updated according to the estimated timing information received from timing exploration. These settings include various parametric values and constraint requirements. In the case of pre-route SI simulation, these settings preferably include estimated etch lengths (from etch delays), jitter budgets, and certain constraint requirements, among others. In the case of post-route SI simulation, these settings include driver and receiver side setup/hold constraints, data/strobe offset values, and the like.

The flow next proceeds to block 110, where simulations of the SI topologies generated at block 108 are run. These SI simulations are used to verify sufficient signal integrity at the applicable constraint limits. They are used as well to optimize design by determining the permissible levels for such parameters as termination values, IO buffer-strengths, via-count, interconnect jitter, stack up tolerances, and the like while meeting SI constraints.

Preferably, the SI topologies of corresponding signals are explored in combination. In source synchronous designs, for example, a correspondence exists between data and strobe signals, as between address and clock signals. Accordingly, SI simulation is executed simultaneously on the SI topologies for corresponding data and strobe signals, preferably by relationally appending their respective SI topologies. SI simulation is similarly executed simultaneously for corresponding address and clock signals.

Such combined SI analysis on the relational data-strobe topologies, and relational address-clock topologies, yield more refined etch-delay estimates. This results in balanced allocation of setup and hold times, such that ample margins are maintained for each about the strobe in a data window (as illustrated in the eye-diagram example of FIG. 1B).

The flow next proceeds to block 112, where pre-route SI timing closure is effected. The parametric values (refined or newly-defined) resulting from SI analysis conducted on the adaptively updated or created SI topologies of block 110 are annotated to the timing models for verification. The refined or newly-defined values for such parameters as etch lengths, slew rates, interconnect jitter, and the like are thus passed back to the timing models used in deriving the initial timing estimates. The timing models are updated in light of these simulation-provided values to confirm that the timing constraints remain satisfied.

In this manner, the parametric values initially estimated from timing analysis are confirmed by suitable SI analysis to satisfy the applicable SI constraints and refined, while other parametric values are derived, by SI simulation. These parametric values resulting from SI simulation are used in turn to refine the timing models, with verification being made thereafter that the applicable timing constraints remain satisfied. If so, the results of static and dynamic analyses are accordingly reconciled, and SI to timing closure is complete.

At block 114, layout constraints of the IP core as incorporated into the electronic system design are generated based on SI/Timing closure. The flow proceeds thereafter to block 116, where the layout constraints are applied to guide generation of the required layout. A corresponding floorplan is then obtained and routed in a suitable manner known in the art, after which post-floorplan and post-route SI exploration of the same is carried out for further SI simulation. This is in much the manner that SI exploration was carried out for the pre-route case, as described in preceding paragraphs. As in the pre-route case, post-floorplan/post-route SI simulations are preferably carried out in combined manner for corresponding data-strobe topologies and address-clock topologies.

The etch length, slew rate, and interconnect jitter parameters resulting from post-floorplan and post-route SI simulations are again exported back at block 118 to further update the timing models, much as in block 112. The timing is again verified using the timing models further updated in the context of post-floorplan and post-route SI analysis. Verification is made that the applicable timing constraints still remain satisfied.

The synergistic intercoupling of analyses illustrated in FIGS. 2A-2B permits the use of SI analysis to actually refine timing constraints. For example, the slew rates of signals, which indicate the extent of change experienced by signals in the given design, have a bearing on the associated setup/hold time constraints. SI simulations conducted as disclosed herein would provide slew-rates of signals that could in turn be considered in setting the applicable timing constraints for optimal design. The hold time constraint for a signal may in certain cases vary with its slew rate. For instance, the applicable constraint may be set accordingly to, say, 160 ps for a signal slew rate of 1V/ns, while the same constraint might be set differently to, say, 200 ps for a signal slew rate of 2V/ns.

Implementation and use of the processes illustrated in FIGS. 2A-2B yield a number of automated features for optimization of design ancillary to verification, including:

Automatic update (variation) of constraint limits based on data rate, slew rate of signals, and predetermined threshold values selected for the design;

Automatic calculation of relative etch-delays for setup/hold times adaptively balanced about a strobe center within a data window, in light of intrinsic signal uncertainty due to jitter;

Automatic transfer of various timing information between static and dynamic analyses, preferably in the form of etch-delay and jitter values, and corresponding update or auto-creation of SI topologies based thereon for subsequent real-time simulation analysis;

Automatic creation of SI topologies based on parameter values obtained by static timing exploration; and, Automatic transfer of information obtained from SI analysis—such as cross-talk jitter, derating, and etch-lengths—to timing models for timing closure.

Figure 2C:
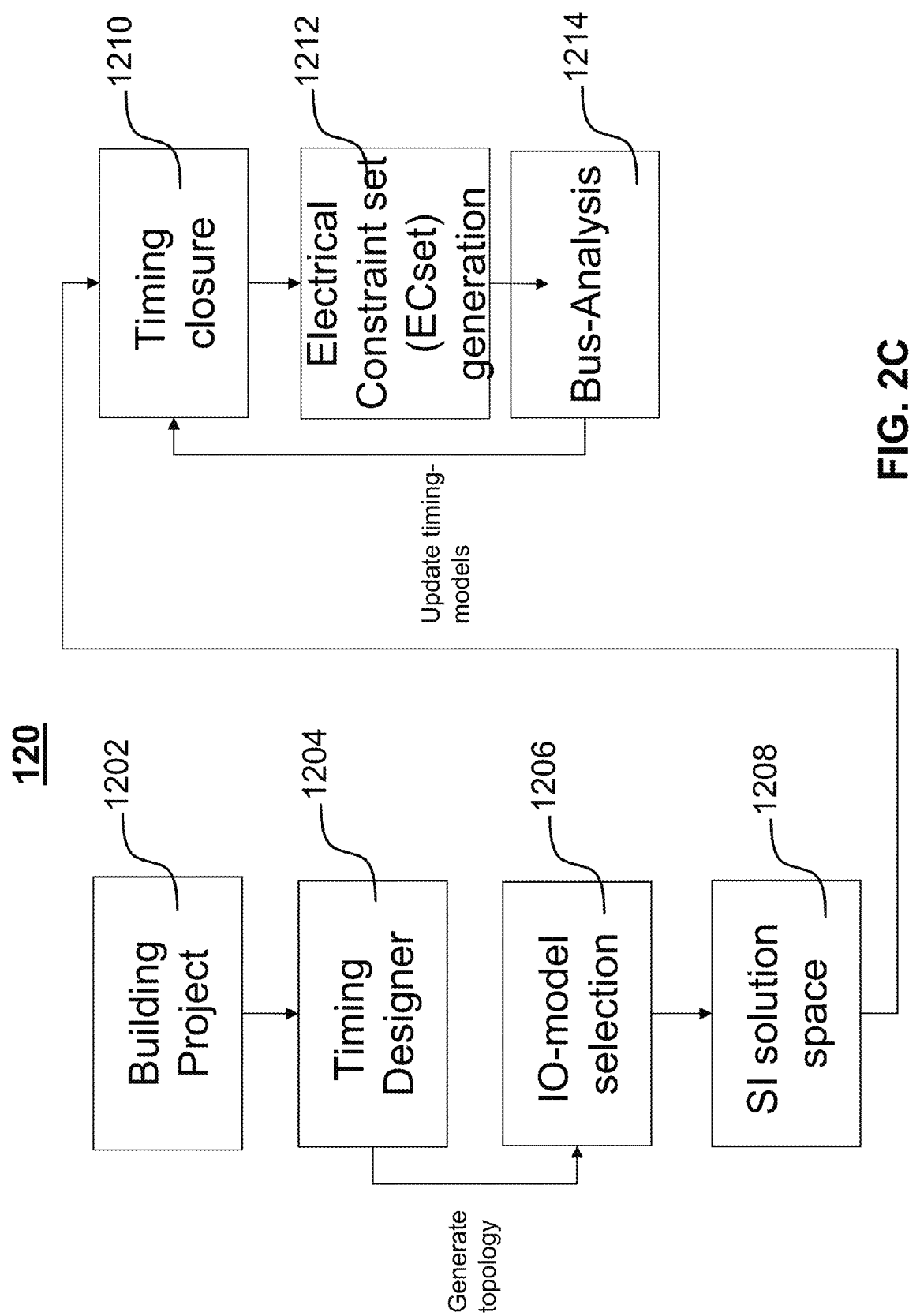
FIG. 2C is a block diagram of a system formed in accordance with an exemplary embodiment of the present invention.

FIG. 2C illustrates a simplified block diagram of functionally intercoupled 'units' programmably implemented for computer execution in a system 120 realized in accordance with an exemplary embodiment of the present invention. While they are separately represented in FIG. 2C for brevity and clarity, one skilled in the art will appreciate that the 'units' 1202-1214 may be programmably implemented and stored in computer readable media in any suitable form or manner known in the art. Each 'unit' 1202-1214 may be implemented as a separately executed module or as part of one or more cooperatively executed modules. That is, the actual programmatic delineation between one unit and another is not important to the present invention, and one skilled in the art will readily recognize that such delineations in computer executed units may merge to suit the requirements of specific applications.

The building project, or design capture, unit 1202 is preferably configured to prepare for timing and signal exploration and timing closure to be conducted on the electronic system design at hand. The unit thus carries out the design capture and auto-configuration processes 102, 104. Unit 1202 is coupled to a timing designer unit 1204 which operates on the captured design and auto-configured timing models to automatically generate the timing parameter estimates of process 106. An IO model selection unit 1206 coupled to receive from the timing designer unit 1204 its timing estimates and recommendations, in order to generate or update the required SI topologies, as provided by the processes 108, 110. An SI solution space unit 1208 then executes suitable SI simulations on the configured SI topologies, as provided by process 110, whose results are used to generate the eye diagram waveforms displayed to the user.

The IO-model selection and SI solution space units 1206 and 1208 effectively form a signal exploration unit which configures and actuates the SI simulation(s) required for dynamic analysis. Not shown in FIG. 120 is the user interface unit suitably coupled to one or more of the units 1202-1214 by which the user may interact with system 120 and view the various display windows generated during its operation.

A timing closure unit 1210 is coupled to export SI analysis results obtained by solution space unit 1208 to the timing designer unit 1204 for pre-route re-verification of timing parameters and update of the timing models according to process 112. An electrical constraint set (ECset) generation unit 1212 is coupled to thereafter derive layout constraints for use in floorplan generation and routing for the electronic system design, as provided by process 114. The layout constraints are applied, and further post-floorplan and post-route SI simulations conducted, by a bus analysis unit 1214 according to process 116. Results of post-floorplan/post-route SI simulation are then passed back for timing closure again by unit 1210.

The units 1212 and 1214 together a signal exploration unit which configures and actuates the SI simulation(s) required for dynamic analysis at the post-route stage. These units 1212 and 1214 may suitably share or invoke resources for SI topology configuration available as part of the IO-model selection and SI solution space units 1206 and 1208 for pre-route signal exploration.

Timing Exploration

Figure 3B:
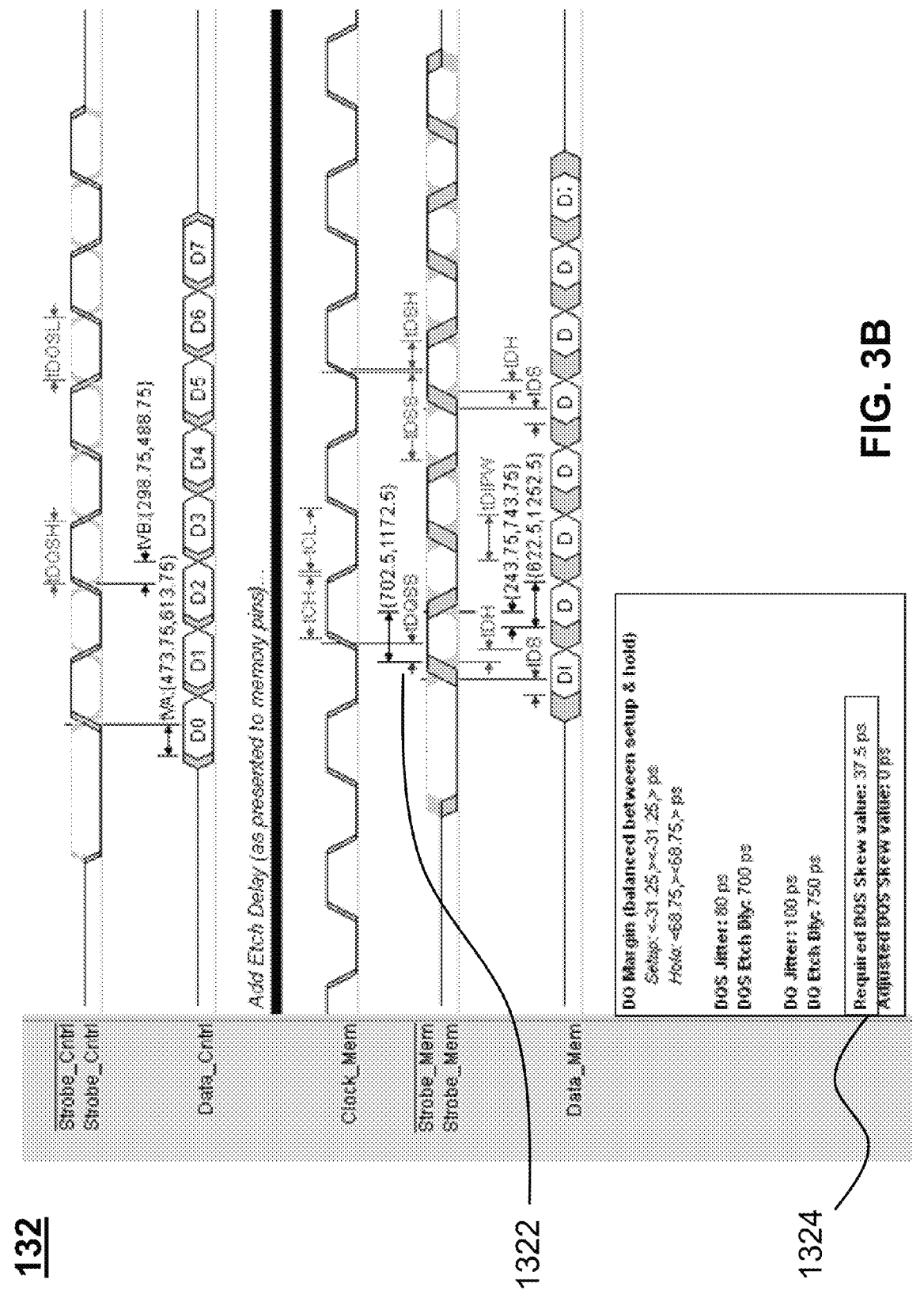

Turning in more detail to the timing exploration process 106, the process is preferably executed by the timing designer unit 1204 in the exemplary system 120 shown in FIG. 2C. FIGS. 3A-3B illustrate examples of various graphic display windows that may be generated by a suitable user interface unit during execution of the process, in accordance with certain exemplary embodiments of the present invention. The process generally includes the execution of a static timing analysis on the available timing models. FIG. 3A illustrates a timing parameter window 130 that may be displayed for the user/designer which conveniently lists identifying information for constraints and timing parameters of interest in the intended application, along with their user-entered, pre-set, or automatically calculated values. Preferably, the user sets certain input parameter values on which to base constraints the automatic calculations, examples of which are indicated at region 1302. These user-input values may include data rate, slew rate, and design threshold values. Region 1304 illustrates examples timing constraint limits set as a function of the user-input data rate, slew rate, and design threshold values. Variable indicia such as compliance-responsive color coding of the displayed constraint limits are preferably employed to provide real-time feedback to the user as to whether or not a particular constraint is in compliance or not at a particular instant.

Regions 1306 and 1308 provide automatically calculated estimates derived from static analysis based on the timing models. In the example shown, region 1306 displays the interconnect jitter budget corresponding to the timing constraint limits—or, the extent to which interconnect jitter may be tolerated without violating the timing constraints. Region 1308 displays the etch delays of signals needed to maintain compliance with the timing constraints.

In accordance with certain aspects of the present invention, timing skew between various interconnects is automatically optimized in light of the applicable timing goals by automatically calculating the relative etch delays required for balanced setup/hold times of given signals. In the case of a memory write cycle, for instance, auto-calculation takes into account a modeling of the controller-delay for delaying data as it comes out of a controller. It also takes into account the jitter that causes uncertainty on the signals (which could be due to clock circuitry, interconnect cross-talk, or IO-buffer delays), as well as variations in delays due to tolerance in stack-up, etch-dimensions, and/or component tolerances.

In this regard a balancing calculation is carried out to balance the setup/hold times for given signals (so as to center the setup/hold time margins within the data valid window on the eye diagram, such as illustrated in FIG. 1B). Such balancing calculation preferably factors in the following parameters:

Automatic update (variation) of constraint limits based on data rate, Minimum Data Valid Window width (mDVW) as a design specific constraint;

Position of leading edge of mDVW with respect to a strobe signal—as a derived position from the timing model(s);

Amount of signal uncertainty in strobe—derived from clock jitter, interconnect jitter, and IO buffer jitter; and, Required Setup and Hold times for the device used in capturing the data—a device specific constraint.

Based on these parameter values and definitions, setup and hold margins are equalized according to a predetermined function which returns the skew value required for a strobe signal with respect to its corresponding data signal, in order to balance the setup/hold times (about strobe center).

In an exemplary embodiment, the automatic optimization is implemented as follows. First, the controller delay model is configured by inputting:

Data-rate, slew-rates for data and strobe and AC thresholds;
Tco (min and max) values for Data and Strobe;
Duty cycle distortion for clock;
Interconnect jitter budgets for Data, Strobe, Clock; and,
Clock etch delay.

The delay for a write-leveling model of the controller is accordingly set.

Following model configuration, exploration of the write cycle is automatically carried out. With reference to the graphic display of timing diagrams 132 illustrated for various signals in FIG. 3B, an estimate of the strobe delay required to meet the tDQSS constraint 1322 is obtained. This constraint 1322 is derived from clock and strobe relative delays, and compliance with its limits ensures successful write-leveling. The data delay is pre-set to be the same as the strobe delay at this point. Thereafter, an adjustment factor is automatically calculated to provide the amount by which data delay is to be offset (that is, to be either added or subtracted) from the pre-set value for balanced setup/hold times. This is updated and displayed at region 1324 of the display window 132.

The read cycle is similarly explored with the delay values obtained from write cycle exploration. An adjustment value is automatically calculated much as for the write-cycle, to provide the amount by which data delay is to be offset (added/subtracted) from its pre-set value for balanced setup/hold times.

Upon exploration of write and read cycles, a trade-off value between the write and read adjustment factors resulting from the write/read explorations is established. The trade-off value leads to optimal setup/hold margins for both write and read cycles.

Figure 3C:
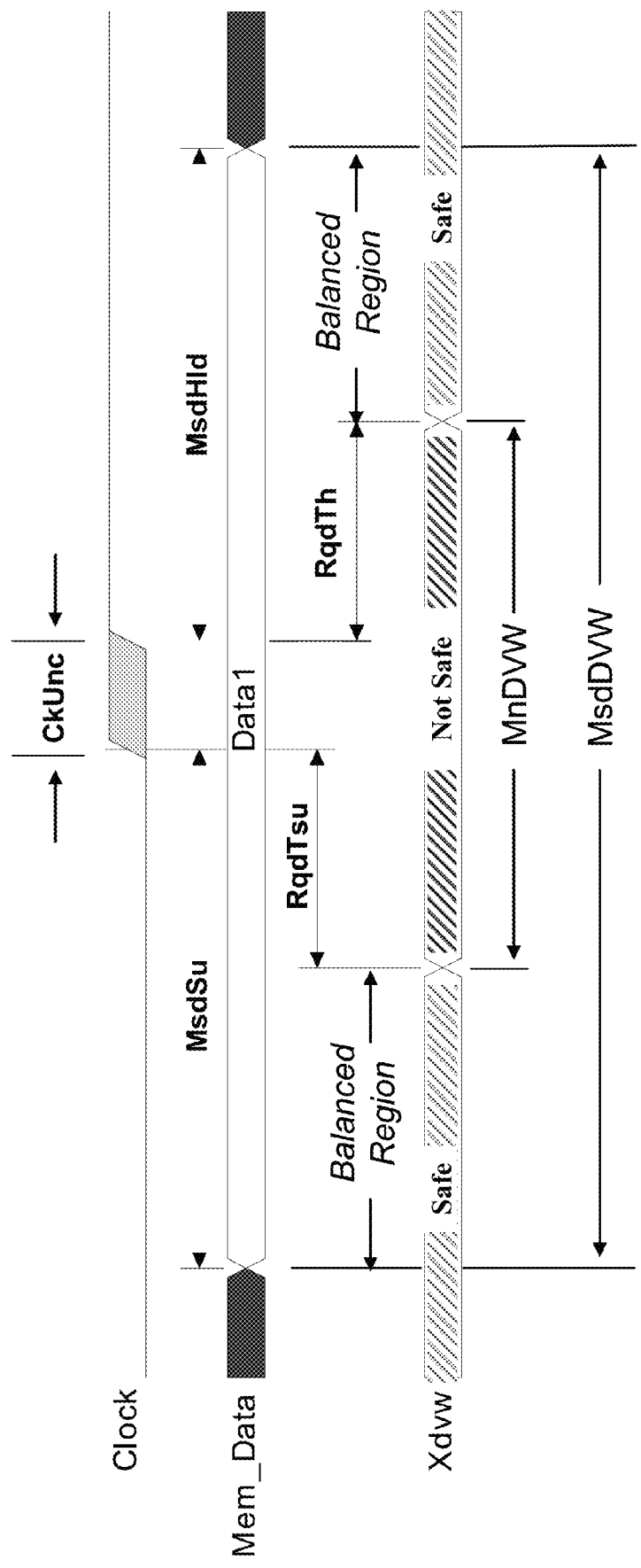
FIG. 3C is a schematic diagram illustrating the timing diagrams of associated signals defining certain relational parameters therebetween in accordance with an exemplary embodiment of the present invention.

With reference to the timing diagrams 134 schematically illustrated in FIG. 3C, the automatic balancing of setup and hold margins is preferably carried out in the exemplary embodiment disclosed according to the following equations:

$$MsdSu + (CkUnc)/2 = (MsdDVW - MnDVW)/2 + RdqTsu + (CkUnc)/2 \quad \text{(Eq. 1)}$$

where, $MnDVW = RqdTsu + CkUnc + RqdTh$

The parameters are defined as follows: Measured Data Setup Time (MsdSu); Measured Data Hold Time (MsdHld); Strobe Uncertainty (CkUnc); Required Data Setup Time (RdqTsu); Required Data Hold Time (RqdTh); Minimum Data Valid Window (MnDVW); and, Measured Data Valid Window (MsdDVW).

Substituting the equation for MnDVW into Eq. 1 and simplifying provides the additional delay for the strobe/clock, expressed as:

$$StrbAddr = (MsdDVW + RdqTsu - RqdTh - CkUnc)/2 - MsdSu \quad \text{(Eq. 2)}$$

With the resulting optimization, the Balanced Regions indicated in FIG. 3C are substantially equalized.

Signal Exploration

Turning next in more detail to the SI topology configuration process 108 shown in FIG. 2A, the process is preferably executed by the IO model selection and SI solution space units 1206, 1208 in the exemplary system 120 shown in FIG. 2C. Process 108 guides the user/designer through the automatic creation and/or adaptation of SI topologies based on information derived from timing exploration calculations based on timing models. The process generally includes the transfer of parametric values from the timing models to aid in the configuration of suitable SI topologies for SI simulation. Using the transferred information, together with the timing constraints, new SI topologies may be accordingly created or pre-existing SI topologies may be accordingly updated for SI simulation.

Figure 4A:
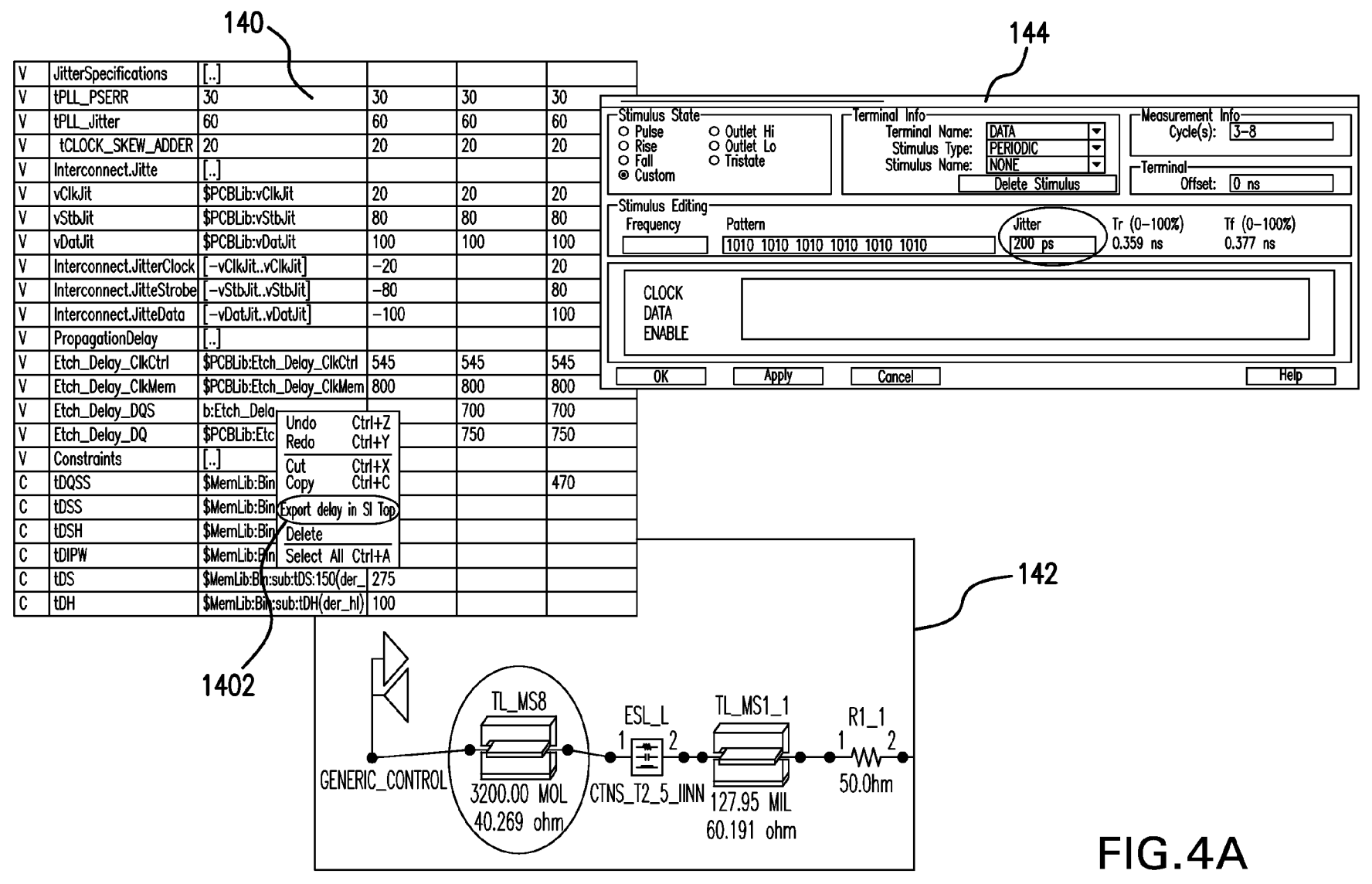
Figure 4B:
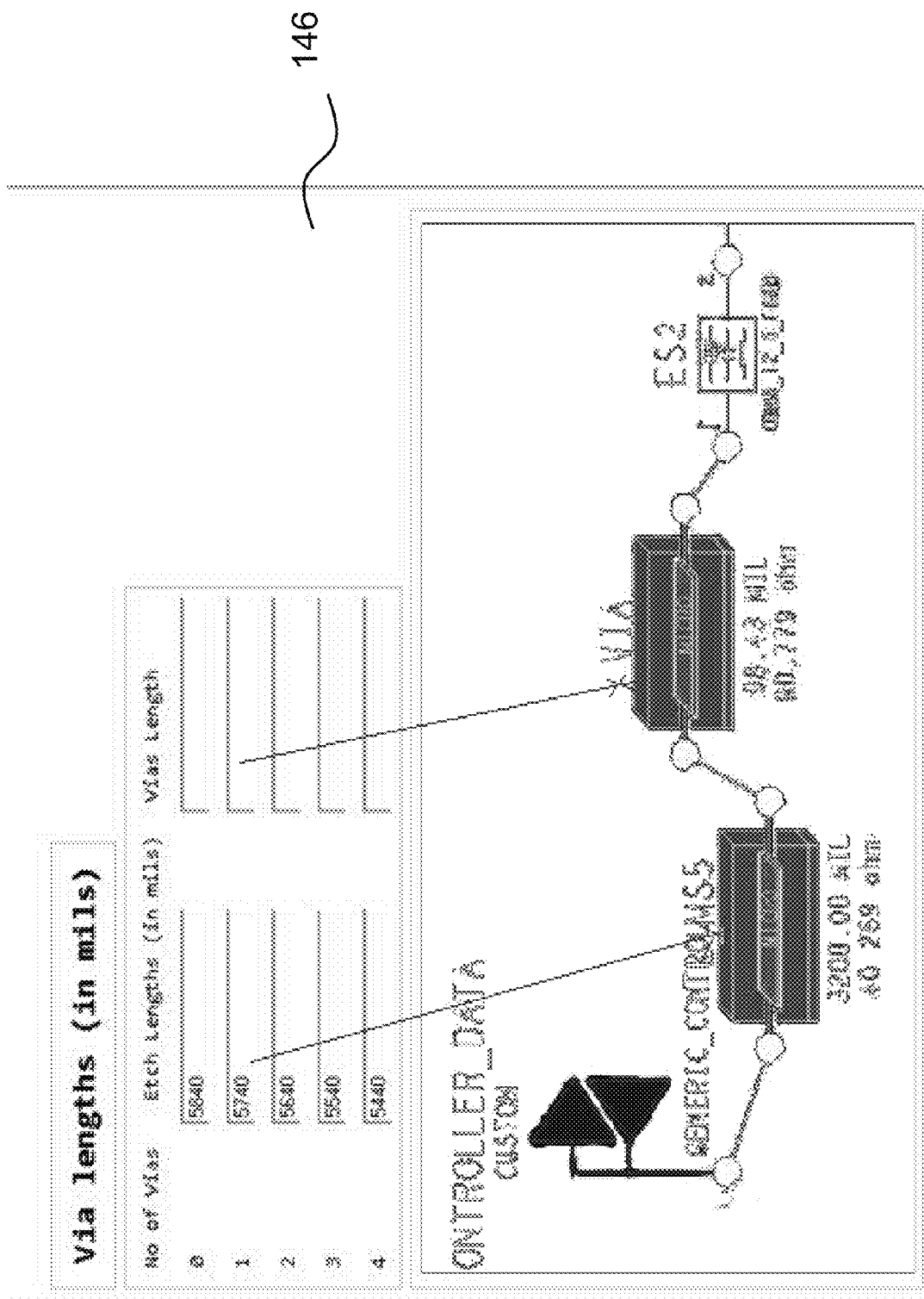
FIG. 4B is an illustrative representation of a graphic user interface generated during system operation in an exemplary embodiment of the present invention, showing a dialog window for mapping certain parametric values from timing analysis to an SI topology.

FIGS. 4A-4B illustrate examples of various graphic display windows that may be generated by a suitable user interface unit during execution of the SI topology configuration process, in accordance with certain exemplary embodiments of the present invention. The various graphic windows are shown superimposed one over the other, as may occur when the user intercouples timing exploration windows with SI topology configuration windows for the coordinated exchange of parametric data therebetween.

Timing analysis provides initial rough estimates on such parameters as etch delays and jitter budget for compliance with the applicable timing constraints. Referring to FIG. 4A, etch delays from the timing parameter window 140 are explored for further refinement upon SI verification when incorporated into simulated SI topologies 142 (defined for example by the interconnection of models representing IO buffers, physical traces, and vias). The jitter-budget exported from the timing parameter window 140 (when so prompted by the user through a pop up menu 1402) is converted to jitter in the stimulus that is to be applied to the SI topology, as reflected in the stimulus window 144.

Etch delays are converted to their corresponding etch lengths and reflected as such in the given SI topology. The conversion takes into account stack-up and, where applicable, the number of vias. The expanded topology window 146 shown in FIG. 4B illustrates the mapping the combination of converted etch lengths (and any vias) to their respective models in the SI topology. In this example, the SI topology shown in window 146 is a predefined topology which is being updated. The user is preferably afforded the option of converting a given etch delay to different combinations of etch lengths and via number. For example, an etch-delay of 700 ps (from timing analysis) could map alternatively to, say, 4000 mil etch length and 1 via, or to 3500 mil and 2 vias, and so on.

In addition to initial parameter estimates and recommendations, certain constraints are also automatically passed as settings for SI topology configuration and simulation. Preferably, constraints such as setup/hold requirements are automatically transferred from the timing models to SI settings.

Figure 4C:
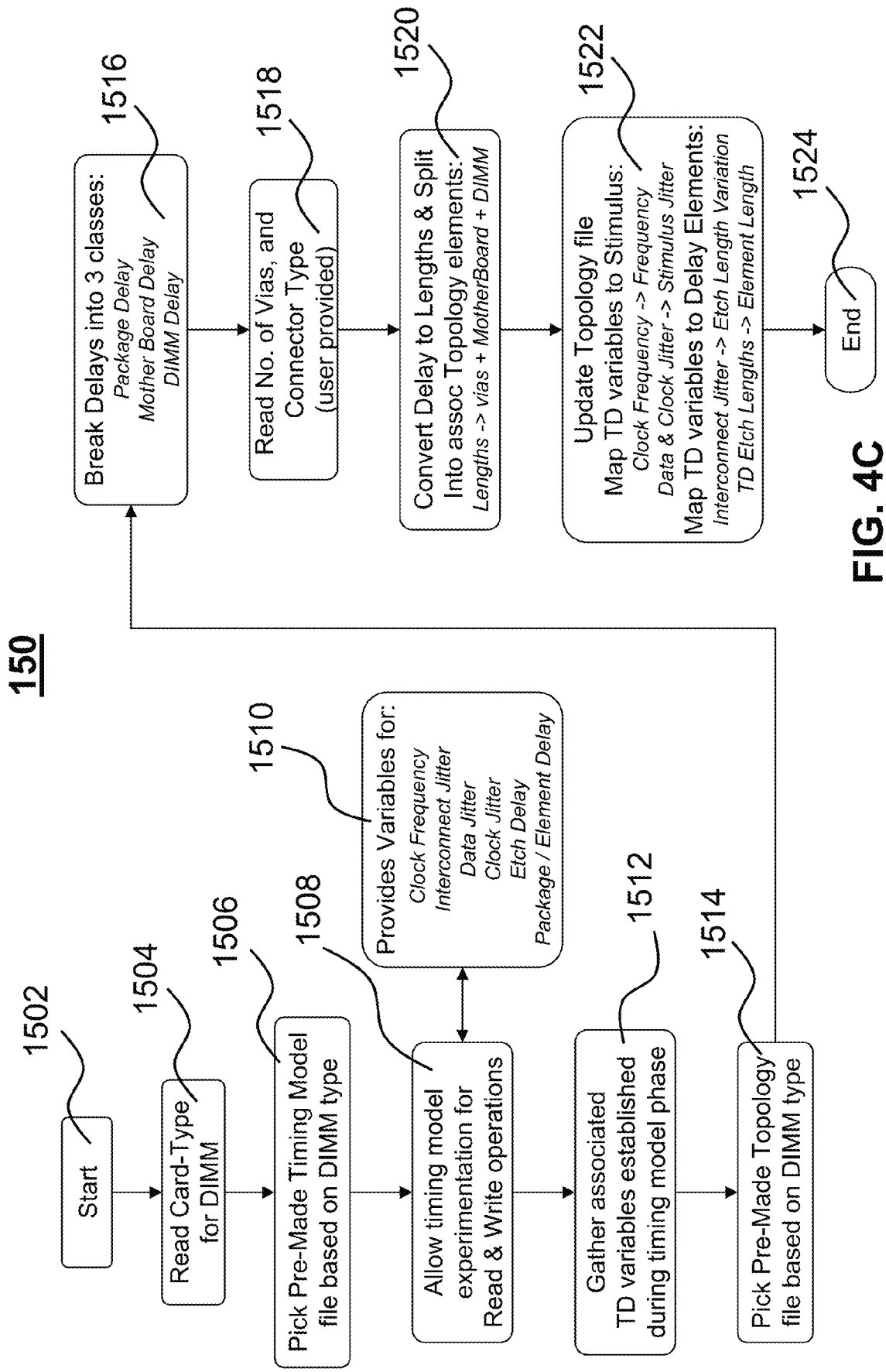
FIG. 4C is a flow diagram illustrating a flow of processes for SI topology generation based on the parametric information automatically transferred from timing analysis in accordance with an exemplary embodiment of the present invention.

FIG. 4C shows for illustrative purposes (with reference to FIGS. 2A-2C) a detailed flow diagram 150 of processes carried out by the IO model selection unit 1206 for SI topology generation based on the parametric information automatically transferred from the timing designer unit 1204, in accordance with an exemplary embodiment of the present invention. In this exemplary embodiment, the system is implemented in connection with a design-in kit as described in preceding paragraphs. The particular kit in the illustrated example is configurable specifically to a dual inline memory module (DIMM) having a plurality of dynamic random access memory (DRAM) devices. The kit contains among its IP resources a series of predefined 'generic' SI topology files, each one having a corresponding timing model supported by the timing designer unit 1204. The timing designer unit maintains a 'dynamic text' listing of variables to update.

As shown, the flow proceeds from start block 1502 to block 1504 where the DIMM card type for the kit's IP is read. A predefined timing model file of the timing designer unit 1204 is then selected at block 1506 based on the kit's DIMM card type. At block 1508, allowance is made for timing exploration by the timing designer unit 1204 to proceed, during which values for such parameters as clock frequency, interconnect jitter, data jitter, clock jitter, etch delay, and package/element delay are automatically updated at block 1510. These parameter values estimated by the timing designer unit 1204 are gathered at block 1512, and a selection specific to the DIMM card type is made from the available 'generic' topology files at block 1514. The gathered delay parameters are preferably classified at block 1516 into three particular types, namely: package delay, mother board delay, and DIMM delay. The flow then proceeds to block 1518, where parameter values such as number of vias and connector type(s) are read. These values are user-provided in the illustrated example.

At block 1520, the delay parameters are converted to conductive trace lengths, and allocated to associated topology elements. For example, a total trace length may be split into the contributing vias, motherboard trace elements, and DIMM trace elements. The selected SI topology file is then updated at block 1522. This includes such mapping of timing designer-estimated values to SI stimulus settings as: clock frequency to frequency; and, data and clock jitter to stimulus jitter. This further includes such mapping of timing designer-estimated values to SI delay element settings as: interconnect jitter to etch length variation; and, data and etch lengths to element length. The process ends thereafter at block 1524.

Figure 4D:
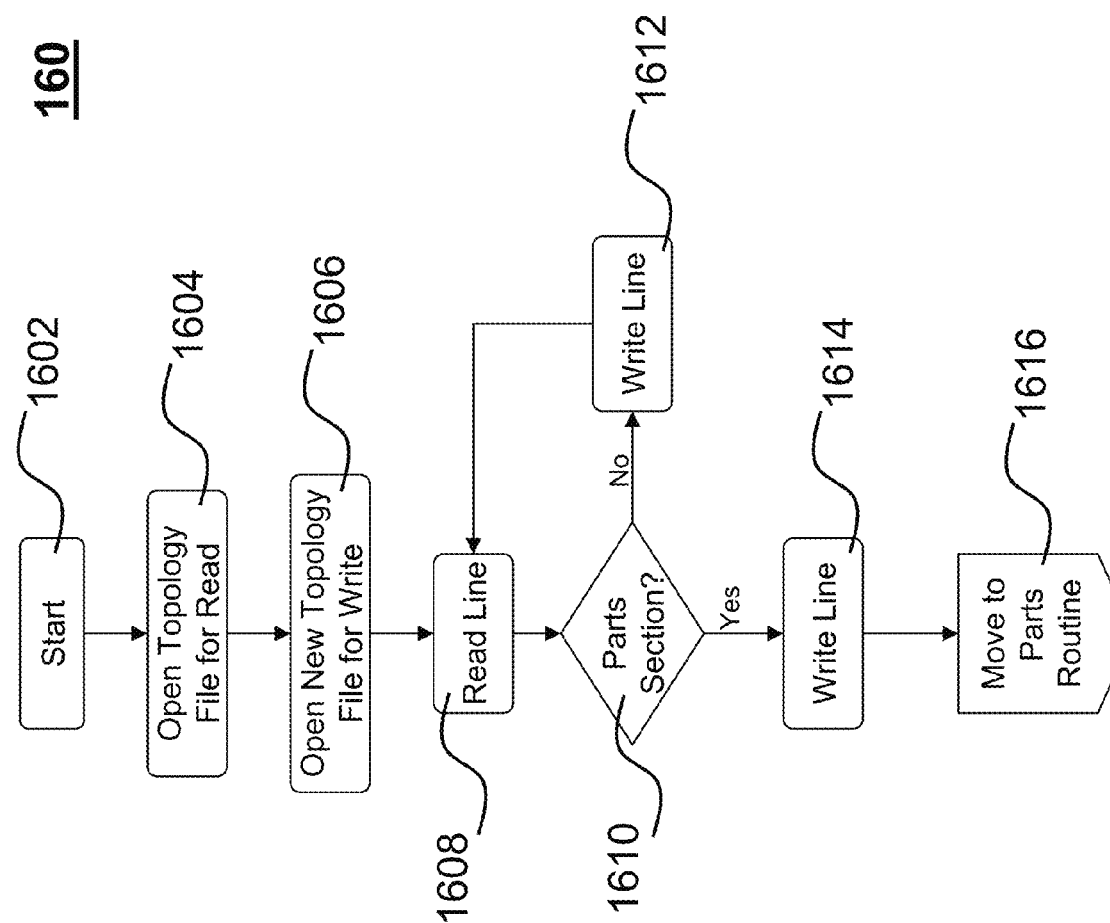
FIG. 4D is a flow diagram illustrating a flow of processes for a script function carried out during the SI topology generation in accordance with an exemplary embodiment of the present invention.

FIG. 4D shows for illustrative purposes a detailed flow diagram 160 of processes for a script function carried out when an SI topology file is read and processed during SI topology generation, such as illustrated in FIG. 4C. The script function navigates through the SI topology file to successively read then write each line of the file, while searching for any 'parts' sections. As shown, the flow proceeds from start block 1602 to block 1604, where a corresponding SI topology file (based on an active timing designer diagram) to be read is opened. At block 1606, a new SI topology file to be written into is opened. Then, at block 1608, a line of the SI topology file is read. A check is immediately made at block 1610 as to whether the line defines a parts section. If not, the flow proceeds to block 1612, where the line is written into the new SI topology file, and the flow subsequently returned to block 1608 for reading of the next line. If the currently read line does define a parts section, the flow proceeds alternatively to block 1614, where the line is written into the new SI topology file, but the flow is passed to block 1616 for parts processing (FIG. 4E).

Figure 4E:
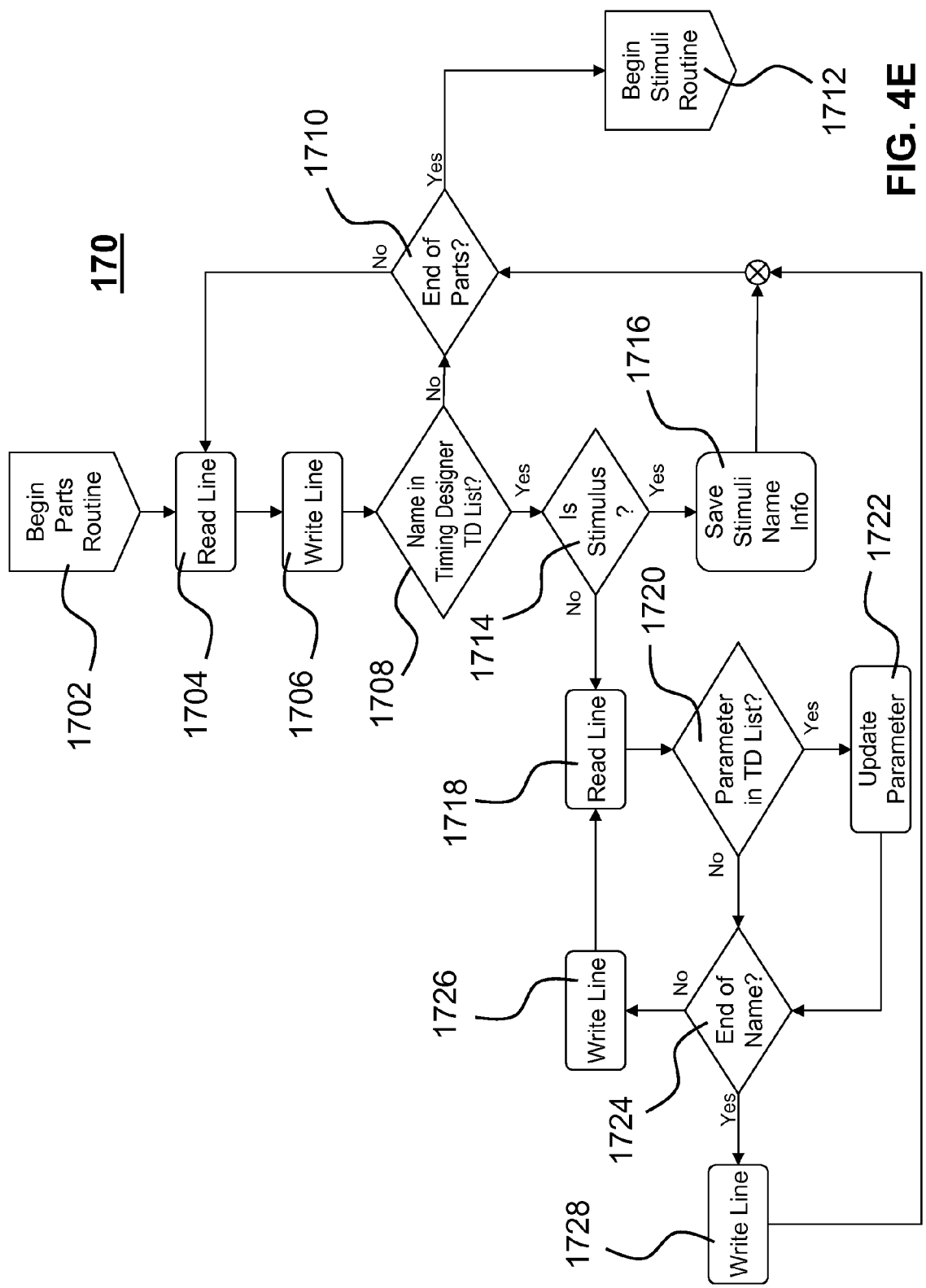
FIG. 4E is a flow diagram illustrating a flow of processes for a parts processing routine carried out during the SI topology generation in accordance with an exemplary embodiment of the present invention.

FIG. 4E shows for illustrative purposes a detailed flow diagram 170 for parts processing during the course of script function navigation through the lines of an SI topology file, such as illustrated in FIG. 4D. The parts processing 'routine' navigates through a parts definition section line-by-line searching for matches with a known part name, if the part actually constitutes a physical delay element. If the parts section otherwise defines a stimulus, the processing 'routine' navigates through until a recognized 'stimuli' name is found, then stores the name for later processing.

As shown, the flow proceeds from start block 1702 to blocks 1704 and 1706, where the given line is read from the current SI topology file and written into the new SI topology file. A search is made at block 1708 for a corresponding element name in a dynamic text list maintained for the timing designer unit 1204. If a match is not found, the flow proceeds to block 1710, where a check is made for the end of the current parts definition. If the current line ends the parts definition section, flow proceeds to block 1712 for execution of a stimuli processing 'routine,' otherwise it returns to block 1704 for reading of the next line. If a match is found at block 1708 with a known element name, the flow continues to block 1714, where a check is made to determine if the part in question is actually a stimulus. If so, the stimulus name is saved at block 1716, and flow is passed to block 1710 for an end-of-parts check. If not, the next line is read at block 1718, and the timing designer dynamic text list is searched at block 1720 until a substitute parameter variable is encountered, whereupon the parameter is updated at block 1722 according to the value in the timing designer dynamic text list. A check is subsequently made at block 1724 for the end of name. If a substitute parameter variable is not encountered at block 1720, the flow proceeds directly to block 1724 for the end of name check. If not yet at the end of name, the line is written at block 1726, and the flow returned to block 1718 for reading of the next line. If the end of name is reached, the line is also written at block 1726, but the flow is returned to block 1710.

FIG. 4F shows for illustrative purposes a detailed flow diagram 180 for stimulus processing during the course of script function navigation through the lines of an SI topology file, such as illustrated in FIGS. 4D and 4E. The stimulus processing 'routine' navigates through the topology file line-by-line looking for a 'stimuli' section. When found, the 'routine' looks further line-by-line for stored stimulus information until found. It then navigates to appropriate 'stimuli' parameters and updates them.

As shown, the flow proceeds from start block 1802 to blocks 1804 and 1806, where the given line is read from the current SI topology file and written into the new SI topology file. A search is made at block 1808 for a corresponding element name in a dynamic text list maintained for the timing designer unit 1204. If a match is not found, the flow proceeds to block 1810, where a check is made for the end of file, and if at the file's end, the processing is ended at block 1812. Otherwise, flow returns to block 1804 for reading of the next line. If a match is found at block 1808 with a known element name, a stimulus section is determined, and the flow continues to block 1814, where the next line is read. A check is subsequently made at block 1816 to determine if associated parameter values for the stimulus section are provided. If so, then each value is updated at block 1818 until the check at block 1820 indicates that the end of the stimulus section is reached. The line is then written into the new SI topology file, and the flow returns to the end-of-file check of block 1810. If not yet at the end of the stimulus section, the current line is written at block 1824, and the flow returns to block 1814 for reading of the next line.

Figure 4G:
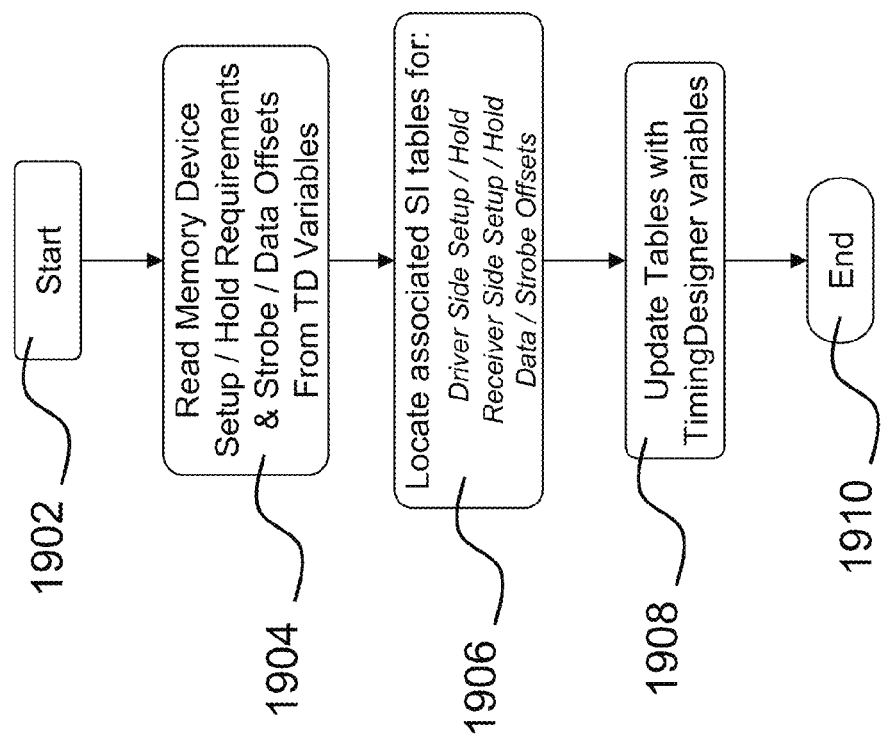
FIG. 4G is a flow diagram illustrating a flow of processes for configuring post-route SI simulation with parametric values from timing in accordance with an exemplary embodiment of the present invention.

FIG. 4G shows for illustrative purposes (with reference to FIGS. 2A-2C) a detailed flow diagram 190 of processes actuated by the ECset generation unit 1212 and/or bus analysis unit 1214 (in cooperation with the timing designer unit 1204) for a post-route situation, in accordance with an exemplary embodiment of the present invention. Flow diagram 190 illustrates the post-route application of parameter values and constraint requirements from the timing designer unit 1204 for setting up post-route SI simulation to be run by the bus analysis unit 1214. As shown, the flow proceeds from start block 1902 to block 1904, where parametric values such as setup/hold constraint requirements and strobe/data offsets are read from the timing designer unit 1204. At block 1906, associated SI tables provided with the available SI topology files are identified. In the example shown, the following tables are identified and opened at block 1908: a driver side setup/hold table; a receiver side setup/hold table; and, a data/strobe offsets table. The 'driver' and 'receiver' designations refer to the driver and receiver portions of the particular bus to be analyzed. The identified tables are updated with the timing designer values at block 1908, and processing is ended at 1910.

Figure 4H:
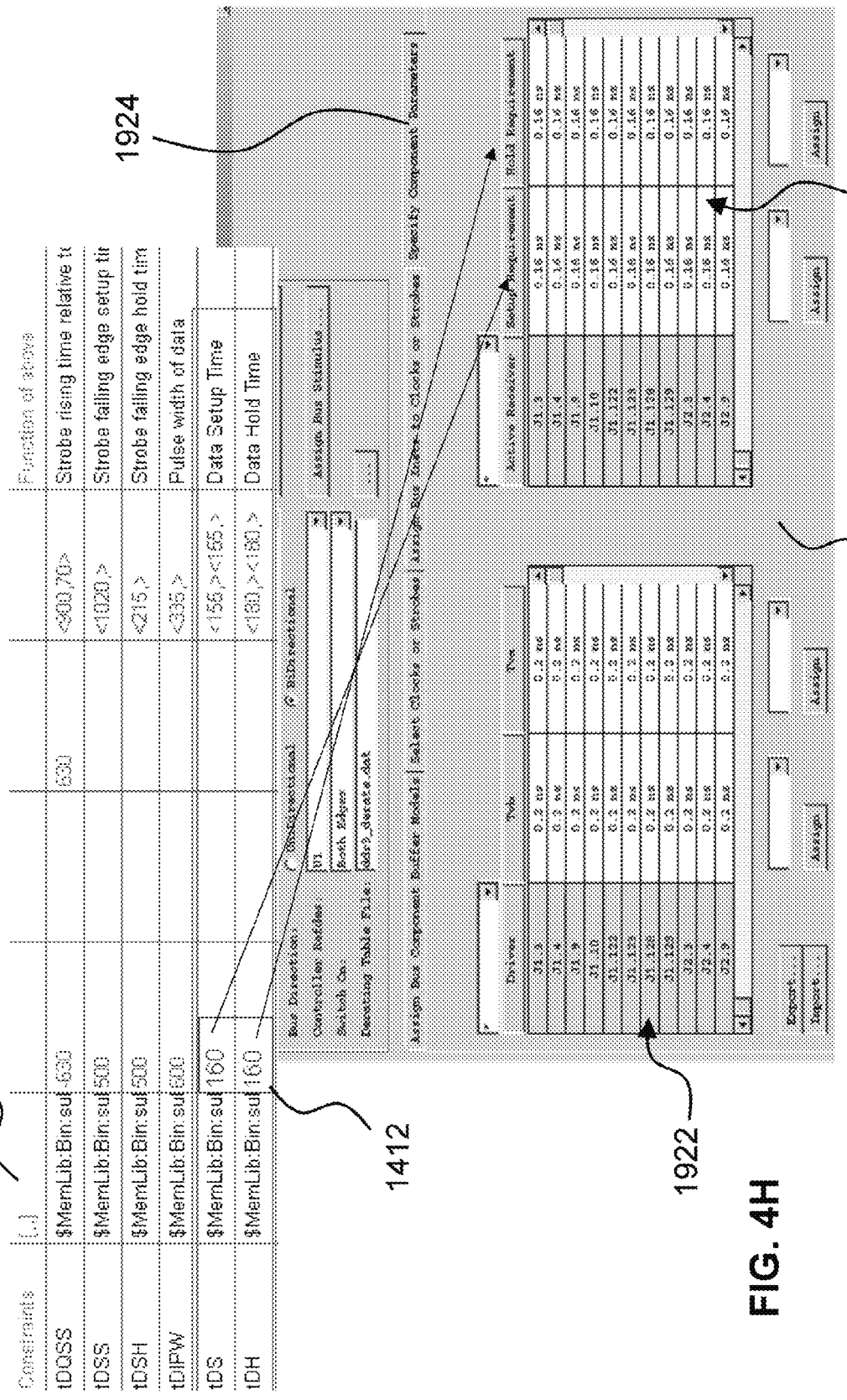
FIG. 4H is an illustrative representation of a graphic user interface generated during system operation in an exemplary embodiment of the present invention, showing the concurrent display of certain portions of dialog windows during post-route SI simulation configuration based on parametric values from timing.
Figure 4I:
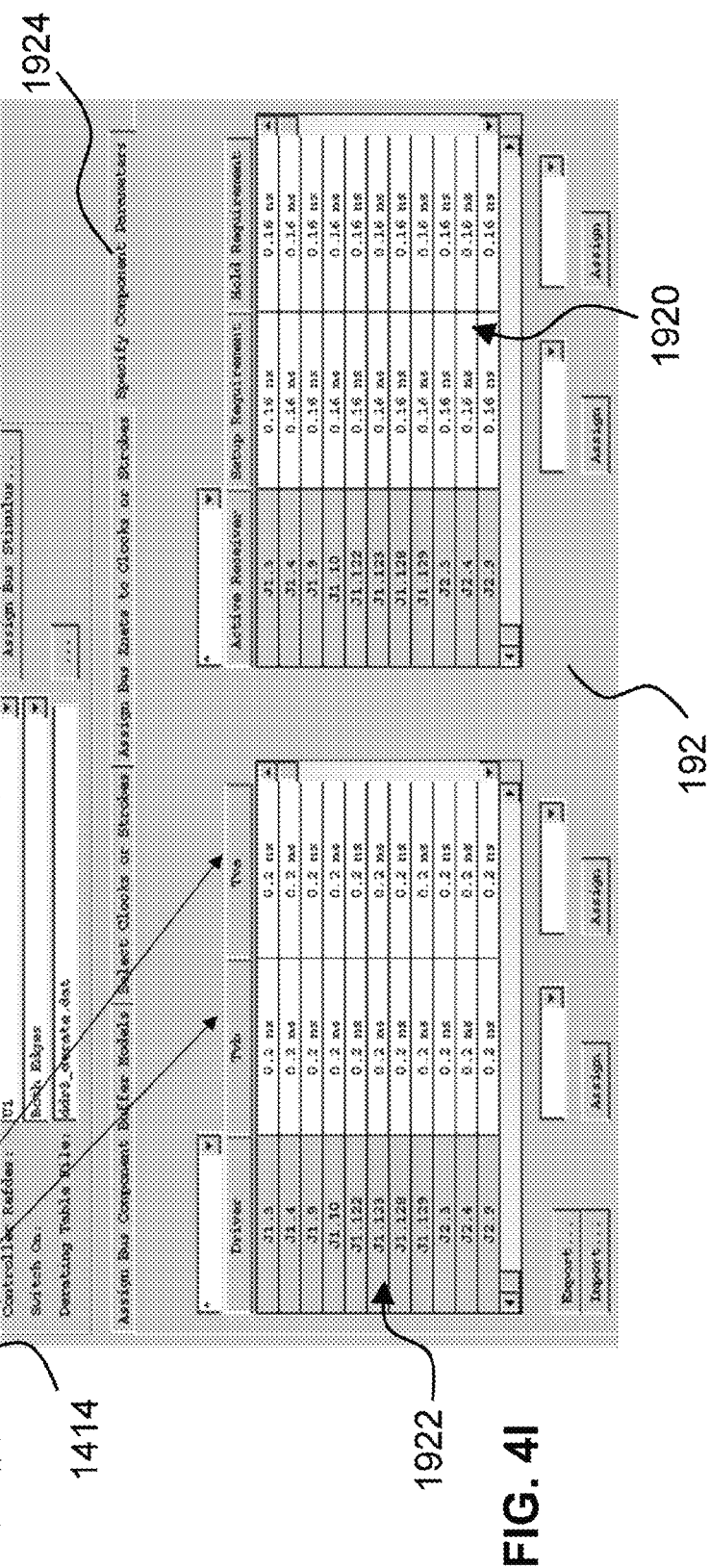
FIG. 4I is an illustrative representation of a graphic user interface generated during system operation in an exemplary embodiment of the present invention, showing the concurrent display of certain other portions of dialog windows during post-route SI simulation configuration based on parametric values from timing.
Figure 4J:
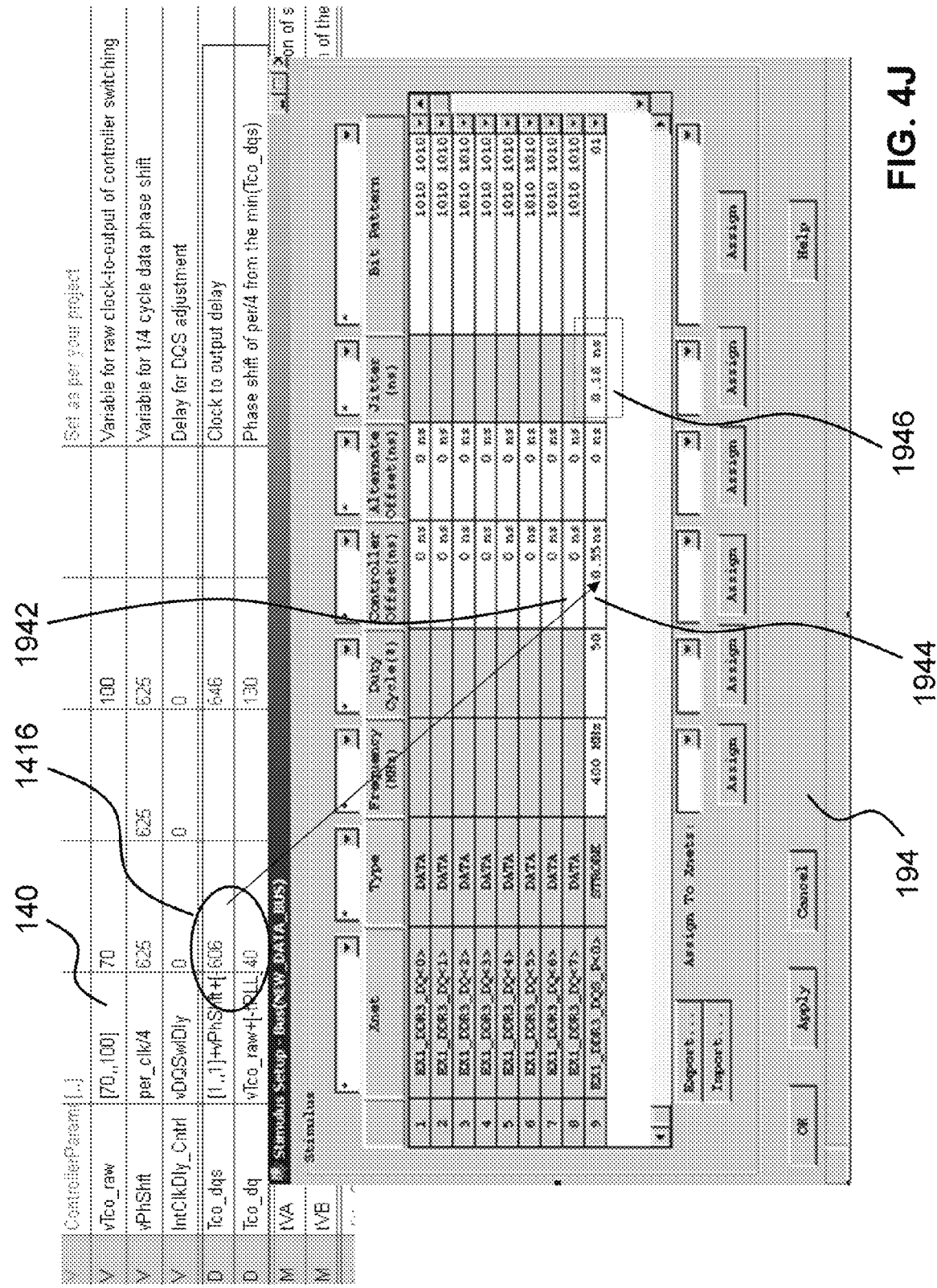
FIG. 4J is an illustrative representation of a graphic user interface generated during system operation in an exemplary embodiment of the present invention, showing another concurrent display of certain dialog windows during post-route SI simulation configuration based on parametric values from timing.

FIGS. 4H-4J illustrate examples of various graphic display windows that may be generated by a suitable user interface unit during execution of the post-route SI simulation update process 190, in accordance with certain exemplary embodiments of the present invention. The various graphic windows are shown superimposed one over the other, as may occur when the user monitors the automatic transfer of parametric data from the timing designer unit 1204 to the bus analysis unit 1214 during configuration of post-route SI simulation.

FIGS. 4H, 4I show respective portions of the timing parameter window 140 opened concurrently with a bus analysis setup window 192. In the examples shown, the bus analysis setup window 192 displays both a receiver side setup/hold table 1920 and a driver side setup/hold table 1922. The display of these tables is prompted in the example by the user's interactive selection of a Specify Component Parameters tab 1924.

In FIG. 4H, the entries of the receiver side setup/hold table 1920 are shown being automatically populated with the corresponding data setup time and data hold time constraint requirements 1412 from the timing parameter window, as updated by the timing designer unit 1204. In FIG. 4I, the entries of the driver side setup/hold table 1922 being automatically populated with the corresponding signal valid time . . . before the transition of strobe (setup time) and signal valid time . . . after the transition of . . . strobe (hold time) constraint requirements 1414 from the timing parameter window updated by the timing designer unit 1204.

FIG. 4J shows a portion of the timing parameter window 140 opened concurrently with a bus stimulus setup window 194. In the example shown, the bus stimulus setup window 194 includes table entries which reflect data/strobe offset values table. The table entry 1942 represents the offset at the given controller model for a data signal, while the table entry 1944 represents the offset at the given controller model for a corresponding strobe signal. The values for these entries 1942, 1944 (as is the table entry 1946 for jitter in the strobe signal) are automatically populated based on values from the timing parameter window 140 updated by the timing designer unit 1204. In this case, the actual offset values are automatically calculated as the difference between the timing parameter window values 1416 for the parameters Tco_dqs (clock to output delay) and Tco_dq (an adjustment factor). A non-zero value for this offset is shown being automatically updated for entry 1944 (for a strobe signal in this example) in the bus stimulus setup window 194, while the updated value for the offset in each of the corresponding data signal entries 1942 remains zero.

Timing Closure

Turning next in more detail to the timing closure process 112, 118 carried out following each of the pre-route and post-route SI analyses in FIG. 2B, the process is preferably controlled by the timing closure unit 1210 which coordinates the exchange of parametric data between each of the solution space and bus analysis units 1208, 1214 and the timing designer unit 1204 in the exemplary system 120 shown in FIG. 2C. The process 112, 118 guides the user/designer through the automatic back annotation of SI results for timing verification and update of timing models. The process generally includes the transfer of parametric values as observed from SI simulation back to the timing models to verify that the timing constraints remain satisfied, and even refine the timing models themselves.

Eye-shape diagrams obtained from SI simulations may identify the need for different relative etch-lengths in order to equalize setup/hold margins. While static timing calculations would provide one set of readings for etch-delays, the eye-shape diagrams (that could indicate a narrow margin on one side of strobe center) may reveal unbalanced margins and prompt the designer to refine the relative etch delays for more balanced setup/hold times. Similarly, to ensure that stack-up variation and cross-talk which cause interconnect jitter are adequately accounted for in the timing-checks, such jitter estimated through SI simulations is annotated back to the timing-models for timing closure.

FIGS. 5A1-5C illustrate examples of various graphic display windows and pull-down menus that may be generated by a suitable user interface unit during execution of the timing closure process, in accordance with certain exemplary embodiments of the present invention. The various graphic windows are shown superimposed one over the other, as may occur when the user exploratively manipulates data shown in respective signal and timing exploration windows, or when a coordinated exchange of parametric data occurs therebetween.

Figure 5A:
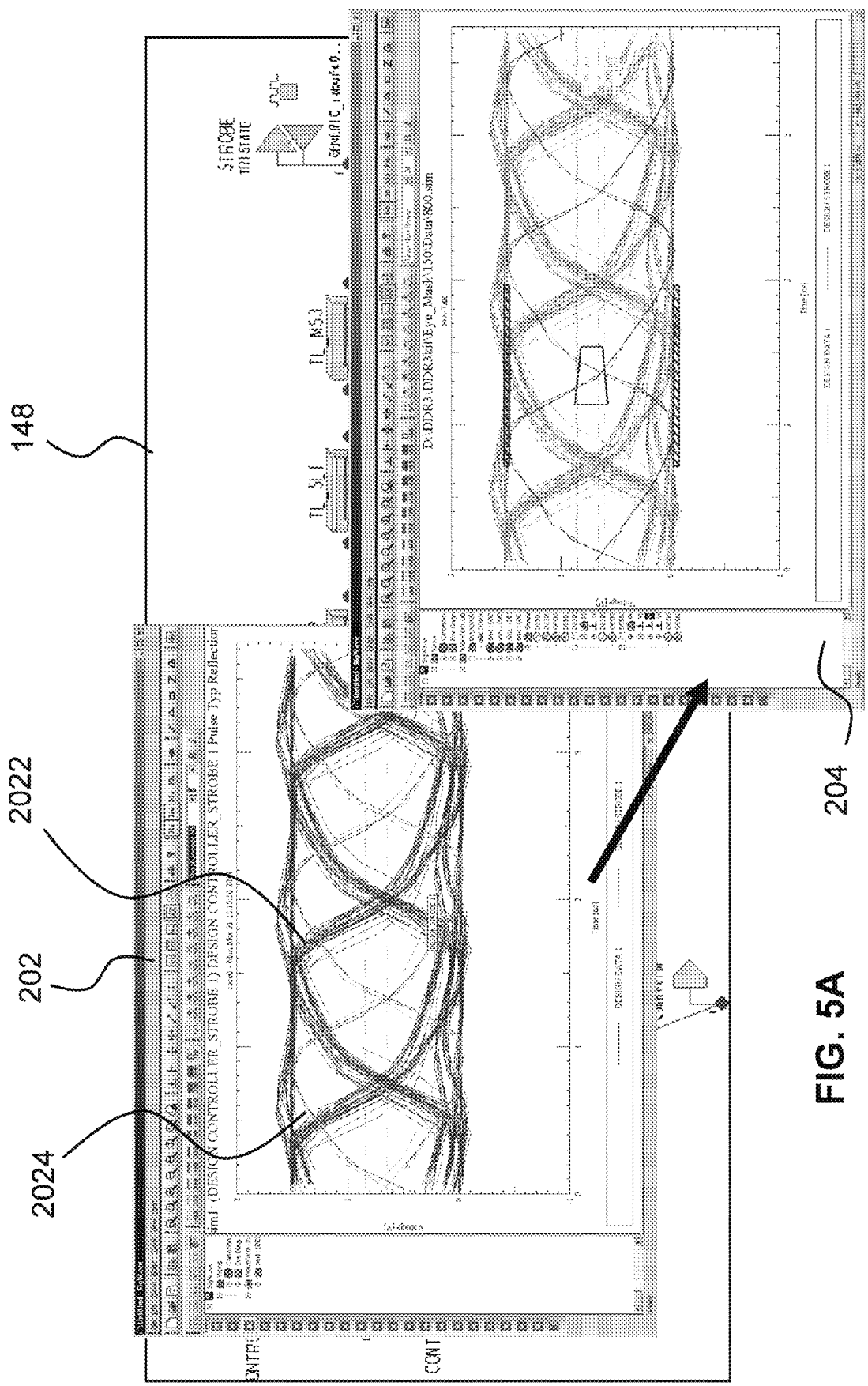

FIG. 5A1 illustrates an example of combined topologies for corresponding data and strobe interconnects, as graphically represented in topology window 148. Referring to FIG. 5A, SI simulation results for these combined topologies (of topology window 148) are represented by respective waveforms 2022, 2024 which define the eye diagrams displayed in window 202. Refined etch-delays are calculated automatically based on the eye shape (eye height and eye-width) from these eye diagrams produced by SI simulation. As indicated by the guide lines/marks in window 204, strobe centering may be optimized by adjustment to balance setup/hold times. Optimal positioning of strobe center occurs where the strobe's complementary components cross at the point of maximum eye-height and maximum eye-width. Toward that end, multiple simulations may be run, with incremental changes made in data-length until this crossing time point is realized.

Figure 5B:
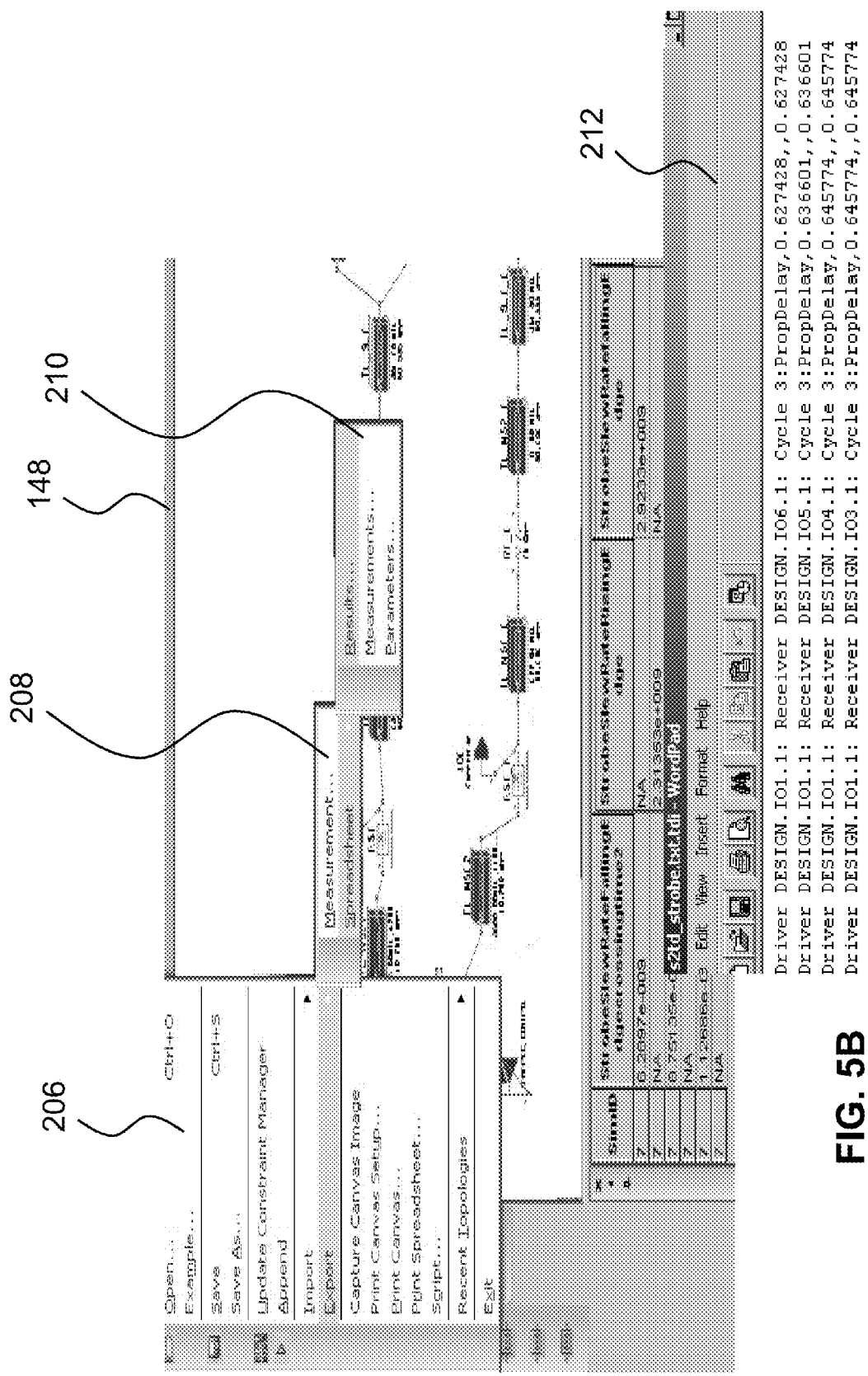
FIG. 5B is an illustrative representation of a graphic user interface generated during system operation in an exemplary embodiment of the present invention, showing the concurrent display of certain dialog windows for exporting parametric values resulting from SI simulation to timing models.

The measurements made from SI simulations performed pre- or post-route are passed back to timing models for timing closure. FIG. 5B shows a sequence of pullout menus 206, 208, 210, whereby the user may export various results to update timing models, such as shown in window 212. Simulation-generated parameter values exported back to the timing models in this manner include refined etch-delays, cross-talk jitter, and slew-rates.

Figure 5C:
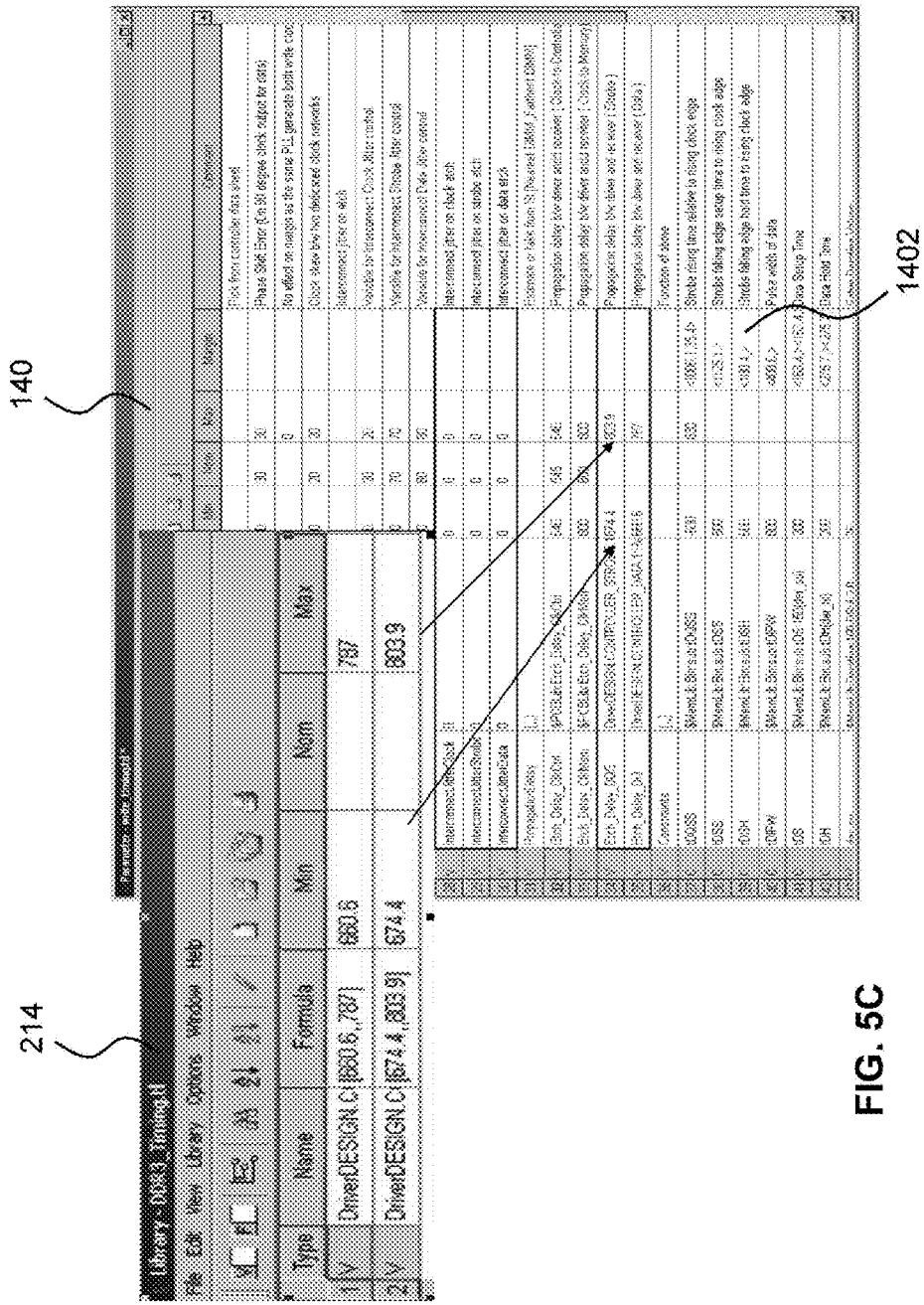
FIG. 5C is an illustrative representation of a graphic user interface generated during system operation in an exemplary embodiment of the present invention, showing the concurrent display of certain dialog windows to confirm the automatic back annotation of parametric values from SI simulation to timing analysis.

Upon back annotation of SI simulation results, timing is re-verified. This is illustrated in FIG. 5C, where refined etch delays exported from SI simulation, as shown in the window 214, are automatically entered in the timing parameter window 140 (corresponding to the timing parameter window 130 of FIG. 3A). As before during timing exploration, a check is made that the constraint limits 1402 remain satisfied (preferably, by color or other condition-responsive indicia). Where necessary, constraint-limits get modified automatically based on exported parameter values—such as slew-rates—back annotated from SI simulations.

Figure 5D:
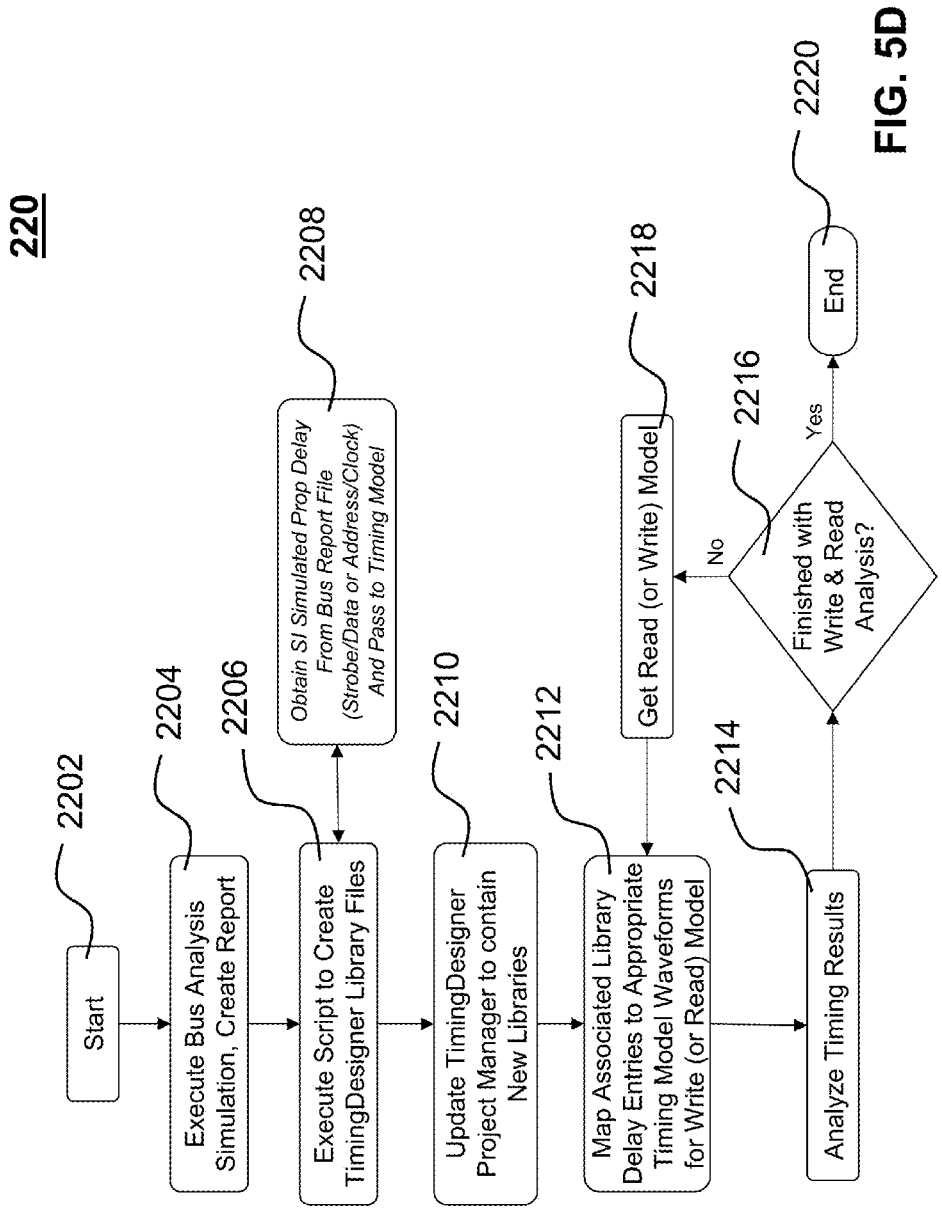
FIG. 5D is a flow diagram illustrating a flow of processes for timing closure following post-route SI simulation in accordance with an exemplary embodiment of the present invention.

FIG. 5D shows for illustrative purposes (with reference to FIGS. 2A-2C) a detailed flow diagram 220 of processes carried out by the timing closure unit 1210 for a post-route situation, in accordance with an exemplary embodiment of the present invention. More specifically, flow diagram 220 illustrates the post-route update of the timing designer unit 1204 following post-route SI simulation by bus analysis unit 1214. As shown, the flow proceeds from start block 2202 to block 2204 where post-route simulation is carried out by unit 1214, and a report of results is created. A predetermined script function is executed at block 2206 to create library files which are accessible by the timing designer unit 1204. As indicated at block 2208, the library files include information obtained from the report files created at block 2204, such as simulated propagation (etch) delays for corresponding strobe and data signals, or corresponding clock and address signals, which are passed back to the timing models for timing closure. At block 2210, the timing designer unit 1204 and building project unit 1202 are accordingly updated to include the created library files. The propagation delay entries in the library files are mapped to their associated timing model waveforms at block 2212 for use in configuring write or read (leveling) models. At block 2214, timing results obtained from actuation of timing designer unit 1204 updated with the library files and refined timing models are analyzed (for a given write or read cycle). A check is made thereafter at block 2216 as to whether the given write or read cycle analysis is finished. If not, the flow proceeds to block 2218, where the appropriate write or read model is acquired and the operation of blocks 2212 and 2214 are repeated thereon. If the analysis is finished, the process is ended at block 2220.

Adaptation of/to Predesigned Board

In addition to application of the subject system and method in the context of pre- and post-layout of an electronic system design to be realized, the system and method may also be applied advantageously in other contexts, where the electronic system is already designed or implemented. For example, an electronic system already designed as a PCT for operation at one frequency may need to be adapted for a certain other frequency. Alternatively, the electronic system design may already be implemented as a PCB and therefore fixed in design, and various signal timing and jitter parameters must be quickly and reliably obtained for the design as actually implemented.

Figure 6A:
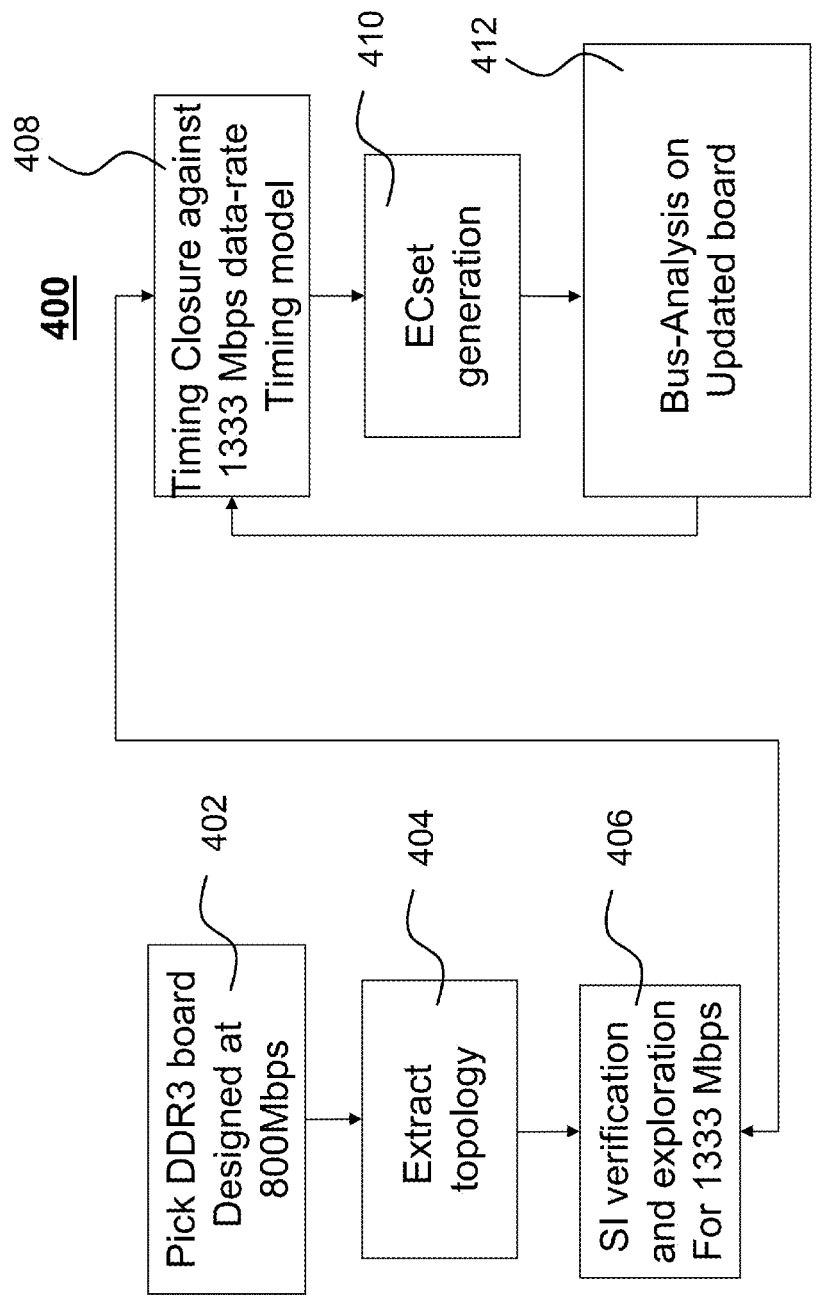
FIG. 6A is a flow diagram illustrating a flow of processes for adapting a predesigned PCB for different operational requirements in accordance with an alternate embodiment of the present invention.

Turning to FIG. 6A, the first example is illustrated by a system 400 formed in accordance with an alternate embodiment of the present invention. The flow of processes shown in FIG. 6A serve in the given example to update a board pre-designed at block 402 as a DDR3 type board to operate at approximately 800 Mbps. The update would adapt the board for actual operation at approximately 1333 Mbps (as indicated at block 408). At block 404, the SI topologies are automatically extracted for relevant portions of the pre-designed DDR3 board based on timing information available for the board. This automatic extraction is done in much the manner described herein (in connection with preceding embodiments); and, the extracted SI topologies preferably include those encompassing the interconnections between the memory controller and DIMM's of the board.

At block 406, signal exploration is carried out, much as described herein, by executing simulation on the extracted SI topologies at the new 1333 Mbps frequencies, and verifying compliance with SI constraint limits. Timing closure is then carried at block 408, as disclosed herein, to verify the propagation delays, jitter, and other such timing parameter values in the context of SI signal exploration against 1333 Mbps data-rate timing models. Upon timing closure, the SI topologies reflect optimal configuration for operation the new 1333 Mbps frequencies. As in preceding embodiments, suitable electrical constraint sets are thereafter derived at block 410 based on these SI topologies for use as layout constraints in floorplan generation and routing for the updated board. The layout constraints are applied, and further post-floorplan and post-route SI simulations conducted on the updated board design, by a bus analysis process at block 412. Results of post-floorplan/post-route SI simulation are then passed back for timing closure again at block 408.

Figure 6B:
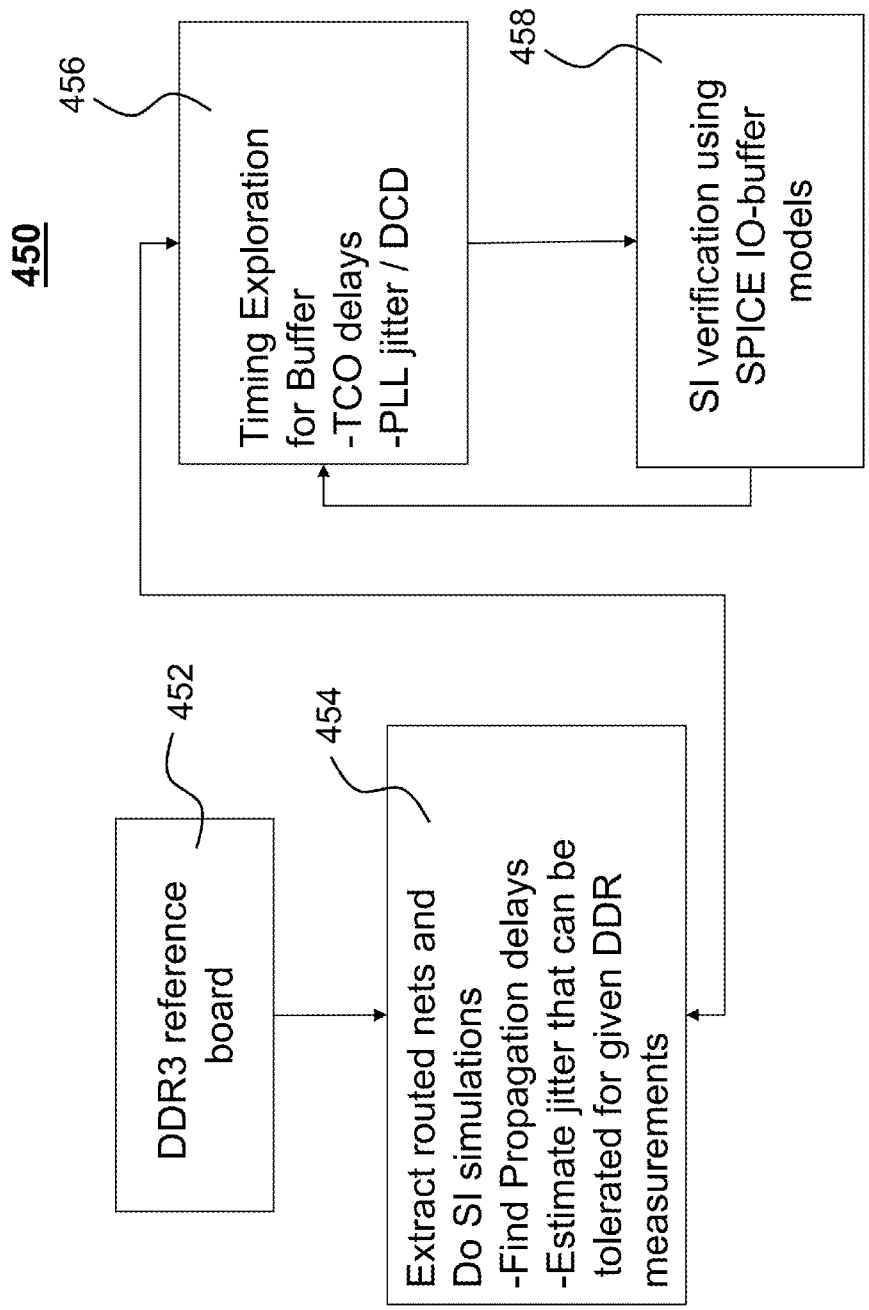
FIG. 6B is a flow diagram illustrating a flow of processes for automatically obtaining estimates of signal parameters within certain timing constraints for a pre-existing PCB in accordance with another alternate embodiment of the present invention; and, FIG. 7 is a block diagram illustrating an exemplary interconnection of units in a processor-based system for implementing the embodiments of systems and methods according to various aspects of the present invention.

Referring to FIG. 6B, a system 450 formed in accordance with another alternate embodiment of the present invention is illustrated, addressing a situation where a reference board design is fixed, and reliable estimates of various signal timing and jitter parameters are to be automatically determined. In the illustrated flow of processes, the reference board shown at block 452 is also pre-designed in the given example as a DDR3 type board. At block 454, the SI topologies for the routed nets of the reference board are extracted, and SI simulations conducted thereon. Propagation delay values are obtained from the results of SI simulation. Estimates for the jitter that may be safely tolerated for the resulting SI measurements are generated. Timing exploration is conducted at block 456 in the context of SI results to characterize the timing and jitter parameter values for the given IC I/O buffers. For instance, the Tco delay (the internal output delay of a buffer with respect to clock), PLL jitter (affecting the clock and necessarily the strobe), and duty cycle distortion (DCD) are estimated. SI verification is carried out thereafter at block 458 using the IO buffer models, and the results passed back to buffer timing exploration at block 456 for sufficient timing closure.

Figure 7:
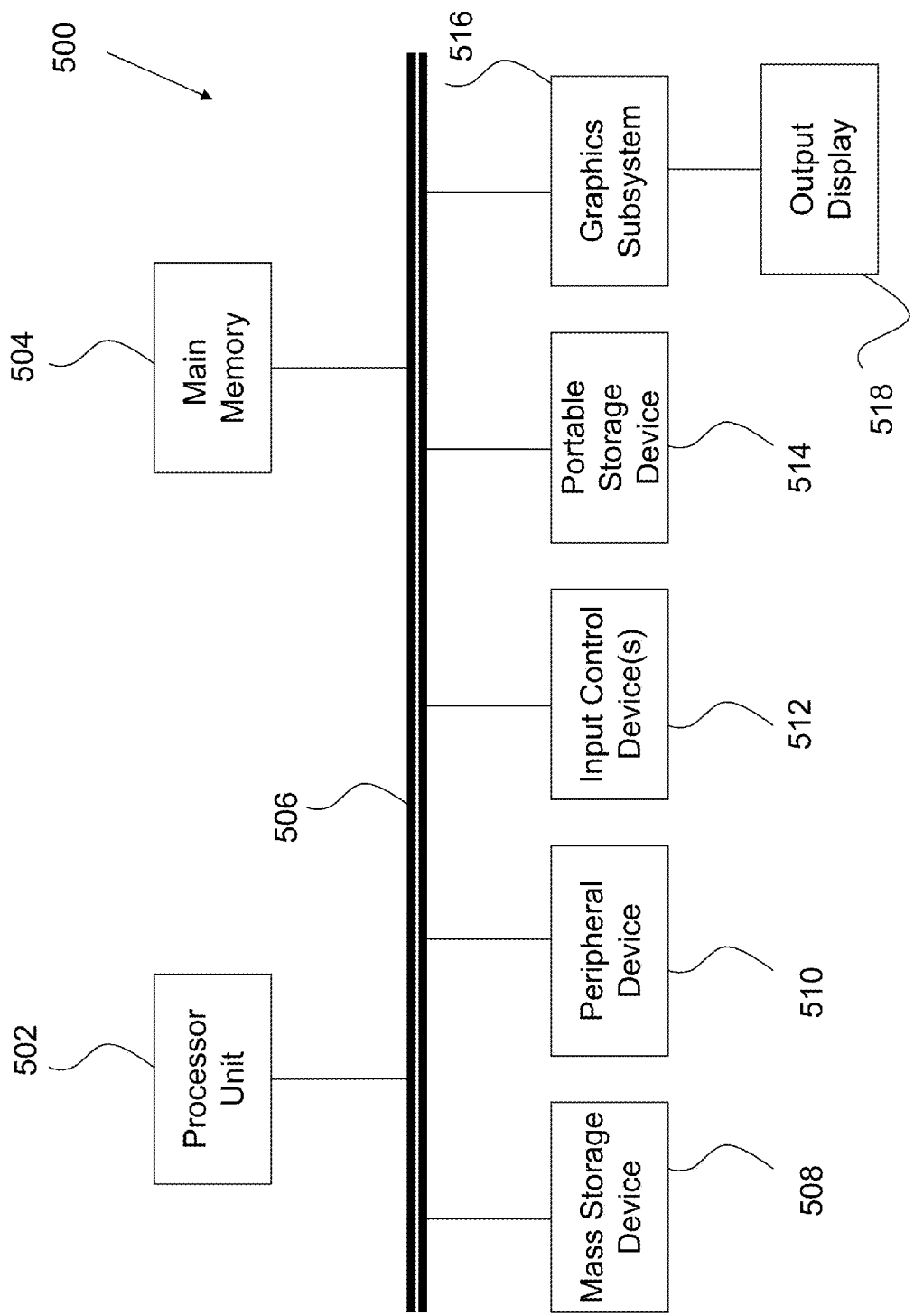

FIG. 7 illustrates a block diagram of a computer system which may be employed to implement various embodiments in accordance with the present invention. A computer system 500 contains a processor unit 502, a main memory 504, an interconnect bus 506, a mass storage device 508, peripheral device(s) 510, input control device(s) 512, portable storage drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor 502. Main memory 504 preferably includes banks of dynamic random access memory (DRAM) as well as high-speed cache memory.

For the purpose of simplicity, the components of computer system 500 are connected via interconnect bus 506. However, computer system 500 may be connected through one or more data transport means. For example, processor unit 502 and main memory 504 may be connected via a local microprocessor bus and mass storage device 508, peripheral device(s) 510, portable storage medium drive(s) 514, and graphic subsystem 516 may be connected via one or more input/output (I/O) buses. Mass storage device 508, which may be implemented with a magnetic disk drive, an optical disk drive, a solid state device, or an attachment to network storage, is non-volatile storage device for storing data, databases, and instructions, to be used by processor unit 502. In a software embodiment, mass storage device 508 may store the software to load it into main memory 504. Mass storage device 508 may include any form of non-transitory computer readable media and may include multiple forms of different media.

Portable storage medium drive 514 operates in conjunction with a portable non-volatile storage medium such as a floppy disk, a compact disk read only memory (CD-ROM), a digital versatile disk read only memory (DVD-ROM), or a memory card such as e.g. Secure Digital High Capacity (SDHC), to input and output data and code to and from the computer system 500. In one embodiment, the software is stored on such a portable medium, and is input to computer system 500 via portable storage medium drive 514. Peripheral device(s) 510 may include any type of computer supported device such as an input/output (I/O) interface, to add additional functionality to computer system 500. For example, peripheral device(s) 510 may include a network interface card to interface computer system 500 to a network.

Input control device(s) 512 provide a portion of the user interface for a computer system 500 user. Input control device(s) 512 may include an alphanumeric keypad for inputting alphanumeric and other key information; and a cursor control device such as a mouse, a track pad or stylus; or cursor direction keys.

In order to display textual and graphical information, computer system 500 contains graphic subsystem 514 and output display(s) 518. Output display 518 may include a cathode ray tube (CRT) display, liquid crystal display (LCD), plasma, digital light processing (DLP) or active matrix organic light emitting diode (AMOLED) display. Graphic subsystem 516 receives textual and graphical information and processes the information for output to display 518.

In a software implementation, a method formed in accordance with an exemplary embodiment of the present invention includes a plurality of computer executable instructions, to be implemented on a computer system. Prior to loading in the computer system, the software may reside as encoded information on a computer-readable tangible or non-transitory medium such as a magnetic floppy disk, a magnetic tape, CD-ROM, DVD-ROM, flash memory, or any other suitable computer readable medium.

In a hardware implementation, such a system in accordance with an exemplary embodiment of the present invention may be realized in any suitable computer based platform known in the art. For example, the system may comprise suitable storage media and one or more dedicated processors or shared processors executing/controlling other functions, wherein the employed processor(s) is programmably configured with processor instructions for performing the functions described herein. Suitable circuits may also be developed to execute certain aspects of these functions.

A system and method implemented in accordance with various embodiments of the present invention provide a number of advantages. Generally, the ability to conduct SI and STA in integrated manner through data-exchange across the flows provides a degree of automated synergy heretofore unseen, which in practical terms, saves time, leads to optimal design, refines available timing and SI analysis tools, and promotes design flexibility.

Among other advantages, the system and method offer the designer a convenient way to obtain relative etch delays needed for balanced setup/hold times across read/write cycles. This leads to optimal starting points for etch-delays in a design, which saves the time otherwise required for several iterations of analyses to determine optimized etch-delays across read/write cycles and adequately account for jitter. IO designers are then able to design controller delay given the reference board etch delays that the system is expected to work with.

Moreover, the system and method facilitate ready customization and configuration of a design-in kit's IP resources for vendor-specific data. In this regard, timing models may be readily configured to vendor-specific models by inputting certain parameters like Tco, clock jitter values, and AC threshold values. New setup/hold derate tables may be added to update timing-models automatically. IO buffer models may be replaced by vendor-specific models in pre-created SI topologies. Pre-created topologies may also be replaced by user-extracted topologies from existing DIMM cards without altering the flow.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for actuating static and dynamic analysis tools in parametrically intercoupled manner for synergistic optimization of an electronic system design comprising:
   a timing designer unit actuating the static analysis tool to conduct timing analysis based on at least one predetermined timing model for the electronic system design, said timing designer unit thereby generating a plurality of estimated values for a plurality of signal parameters in compliance with a plurality of predetermined timing constraints; and,
   a signal exploration unit coupled to said timing designer unit, said signal exploration unit receiving said plurality of estimated values from said timing designer unit and configuring resources of the dynamic analysis tool responsive thereto, said signal exploration unit thereafter actuating the dynamic analysis tool to conduct electrical integrity analysis based on transient simulation, said signal exploration unit generating a plurality of simulated values for a plurality of signal parameters, said plurality of simulated values including refinement of at least one of said estimated values;
   wherein said plurality of simulated values are back annotated to said timing designer unit for timing closure, further compliance with said plurality of predetermined timing constraints being thereby re-verified by further timing analysis according to said simulated values.

2. The system as recited in claim 1, further comprising a design capture unit capturing predetermined parametric information for the electronic system design and configuring resources of the static and dynamic analysis tools responsive thereto.

3. The system as recited in claim 2, wherein said predetermined timing model is updated responsive to said plurality of simulated values for further timing analysis by said timing designer unit based thereon.

4. The system as recited in claim 3, wherein at least one of said plurality of predetermined timing constraints is updated responsive to said simulated values.

5. The system as recited in claim 4, wherein timing constraint requirements for setup and hold times are updated responsive in part to said plurality of simulated values for a slew rate parameter.

6. The system as recited in claim 2, wherein said design capture unit, timing designer unit, and signal exploration unit are disposed within a computer readable design-in kit for a predetermined Intellectual Property (IP) core.

7. The system as recited in claim 1, wherein said timing designer unit automatically defines substantially balanced setup and hold margin estimates for a data signal relative to a corresponding timing signal, according to:

$$MsdSu+(CkUnc)/2=(MsdDVW-MnDVW)/2+RdqTsu+(CkUnc)/2$$

where, $MnDVW=RqdTsu+CkUnc+RqdTh$;

wherein: MsdSu represents a Measured Data Setup Time numeric value; MsdHld represents a Measured Data Hold Time numeric value; CkUnc represents a Strobe Uncertainty; RdqTsu represents a Required Data Setup Time numeric value; RqdTh represents a Required Data Hold Time numeric value; MnDVW represents a Minimum Data Valid Window numeric value; and, MsdDVW represents a Measured Data Valid Window numeric value.

8. The system as recited in claim 1, wherein said signal exploration unit actuates the dynamic analysis tool to conduct signal integrity (SI) analysis based on transient simulation on at least one SI topology behaviorally modeling a conductive interconnect portion of the electrical system design, said signal exploration unit being executed to automatically configure said SI topology and the transient simulation thereon responsive to said plurality of estimated values received from said timing designer unit.

9. The system as recited in claim 8, wherein said plurality of estimated values received by said signal exploration unit include estimated values for at least a relative etch delay between associated signals and a budget for uncertainty due to interconnect jitter.

10. The system as recited in claim 9, wherein said plurality of simulated values back annotated to said timing designer unit include simulated values for interconnect jitter, etch length, and slew rate parameters; said simulated etch length value refining said estimated relative etch delay value.

11. The system as recited in claim 1, further comprising a post-route signal exploration unit coupled to said timing designer unit, said post-route signal exploration unit actuating the dynamic analysis tool to conduct with respect to a plurality of predetermined layout constraints post-route electrical integrity analysis based on transient simulation, said post-route signal exploration unit generating a plurality of post-route simulated values for a plurality of signal parameters, said post-route simulated values being back annotated to said timing designer unit for timing closure.

12. The system as recited in claim 11, wherein said post-route signal exploration unit actuates the dynamic analysis tool to conduct signal integrity (SI) analysis based on transient simulation on at least one SI topology behaviorally modeling a conductive interconnect portion routed for the electrical system design, said post-route SI simulation being updated according to said estimated values for driver side setup and hold constraint requirements; receiver side setup and hold constraint requirements; and, relative offset for associated strobe and data signals.

13. The system as recited in claim 12, wherein said post-route simulated values back annotated to said timing designer unit include simulated values for interconnect jitter, etch length, and slew rate; said simulated etch length value refining an estimated relative etch delay value.

14. The system as recited in claim 1, further comprising a user interface unit generating at least one graphic user interface window for interactively monitoring operation of at least one of said timing designer unit and signal exploration unit.

15. A method for actuating static and dynamic analysis tools in parametrically intercoupled manner for synergistic optimization of an electronic system design comprising:

executing in a computer processor a timing designer process for selectively actuating the static analysis tool to conduct timing analysis based on at least one predetermined timing model for the electronic system design, said timing designer process thereby generating a plurality of estimated values for a plurality of signal parameters in compliance with a plurality of predetermined timing constraints;

executing in a computer processor a signal exploration process operably coupled to said timing designer process, said signal exploration process receiving said plurality of estimated values from said timing designer process and configuring resources of the dynamic analysis tool responsive thereto, said signal exploration process thereafter actuating the dynamic analysis tool to conduct electrical integrity analysis based on transient simulation, said signal exploration process generating a plurality of simulated values for a plurality of signal parameters, said simulated values including refinement of at least one of said estimated values; and, back annotating said plurality of simulated values to said timing designer process for timing closure, whereby compliance with said plurality of predetermined timing constraints is re-verified by further timing analysis according to said simulated values.

16. The method as recited in claim 15, further comprising executing in a computer processor a design capture process for capturing predetermined parametric information for the electronic system design and configuring resources of the static and dynamic analysis tools responsive thereto.

17. The method as recited in claim 15, wherein said timing designer process automatically defines substantially balanced setup and hold margin estimates for a data signal relative to a corresponding timing signal, according to:

$$MsdSu+(CkUnc)/2=(MsdDVW-MnDVW)/2+RdqTsu+(CkUnc)/2$$

where, MnDVW=RqdTsu+CkUnc+RqdTh;

wherein: MsdSu represents a Measured Data Setup Time numeric value; MsdHld represents a Measured Data Hold Time numeric value; CkUnc represents a Strobe Uncertainty numeric value; RdqTsu represents a Required Data Setup Time numeric value; RqdTh represents a Required Data Hold Time numeric value; MnDVW represents a Minimum Data Valid Window numeric value; and, MsdDVW represents a Measured Data Valid Window numeric value.

18. The method as recited in claim 15, wherein said signal exploration process actuates the dynamic analysis tool to conduct signal integrity (SI) analysis based on transient simulation on at least one SI topology behaviorally modeling a conductive interconnect portion of the electrical system design, said signal exploration process being executed to automatically configure said SI topology and the transient simulation thereon responsive to said plurality of estimated values received from said timing designer process.

19. The method as recited in claim 18, wherein said predetermined timing model is updated responsive to said plurality of simulated values for further timing analysis by said timing designer process based thereon.

20. The method as recited in claim 18, wherein at least one of said plurality of predetermined timing constraints is updated responsive to said simulated values, wherein constraint limits for setup and hold times are updated responsive in part to said simulated values for a slew rate parameter.

21. The method as recited in claim 18, wherein said plurality of estimated values received by said signal exploration process include estimated values for at least a relative etch delay between associated signals and a budget for uncertainty due to interconnect jitter.

22. The method as recited in claim 21, wherein said plurality of simulated values back annotated to said timing designer process include simulated values for interconnect jitter, etch length, and slew rate parameters; said simulated etch length value refining said estimated relative etch delay value.

23. The method as recited in claim 18, further comprising a post-route signal exploration process actuating the dynamic analysis tool to conduct with respect to a plurality of predetermined layout constraints post-route SI analysis based on transient simulation on at least one SI topology behaviorally modeling a conductive interconnect portion routed for the electrical system design, said post-route signal exploration process generating a plurality of post-route simulated values for a plurality of signal parameters, said plurality of post-route simulated values being back annotated to said timing designer process for timing closure.

24. The method as recited in claim 23, wherein said post-route SI simulation is updated according to said plurality of estimated values for driver side setup and hold constraint requirements; receiver side setup and hold constraint requirements; and, relative offsets for associated strobe and data signals.

25. The method as recited in claim 24, wherein said post-route simulated values back annotated to said timing designer process include values for interconnect jitter, etch length, and slew rate; said simulated etch length value refining said estimated relative etch delay value.

26. The method as recited in claim 15, further comprising a user interface process generating at least one graphic user interface window for interactively monitoring operation of at least one of said timing designer process and said signal exploration process.

27. A design-in kit for an Intellectual Property (IP) core stored on a computer readable medium, for actuating static and dynamic analysis tools in parametrically intercoupled manner for synergistic optimization of an electronic system design, the design-in kit comprising program instructions executable in a computer processor for:

执行 executing a design capture process for capturing predetermined parametric information for the electronic system design and configuring resources of the static and dynamic analysis tools responsive thereto;

executing a timing designer process for selectively actuating the static analysis tool to conduct timing analysis based on at least one predetermined timing model, said timing designer process thereby generating a plurality of estimated values for a plurality of signal parameters in compliance with a plurality of predetermined timing constraints;

executing a signal exploration process operably coupled to said design capture and timing designer processes, said signal exploration process receiving said estimated values from said timing designer process and configuring said resources of the dynamic analysis tool responsive thereto, said signal exploration process thereafter actuating the dynamic analysis tool to conduct signal integrity (SI) analysis based on transient simulation on at least one SI topology behaviorally modeling a conductive interconnect portion of the electrical system design, said signal exploration process generating a plurality of simulated values for a plurality of signal parameters, said plurality of simulated values including refinement of at least one of said plurality of estimated values;

back annotating said plurality of simulated values to said timing designer process for timing closure, whereby compliance with said predetermined timing constraints is re-verified by further timing analysis according to said simulated values;

executing a post-route signal exploration process to actuate the dynamic analysis tool to conduct with respect to a plurality of predetermined layout constraints post-route SI analysis based on transient simulation on at least one SI topology behaviorally modeling a conductive interconnect portion routed for the electrical system design, said post-route signal exploration process generating a plurality of post-route simulated values for a plurality of signal parameters; and, back annotating said post-route simulated values to said timing designer process for post-route timing closure.

28. The design-in kit as recited in claim 27, wherein said signal exploration process is executed to automatically configure said signal integrity (SI) topology and the transient simulation therefor responsive to said plurality of estimated values received from said timing designer process.

29. The design-in kit as recited in claim 27, wherein said design-in kit is pre-configured for an intellectual property (IP) core defined by a dual inline memory module (DIMM) having a plurality of dynamic random access memory (DRAM) devices, said design-in kit including a plurality of predefined signal integrity (SI) topology files each corresponding to a timing model compatible with said timing designer unit.

* * * * *